US007082164B2

(12) United States Patent
Chaddha

(10) Patent No.: US 7,082,164 B2
(45) Date of Patent: Jul. 25, 2006

(54) MULTIMEDIA COMPRESSION SYSTEM WITH ADDITIVE TEMPORAL LAYERS

(75) Inventor: Navin Chaddha, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 883 days.

(21) Appl. No.: 10/151,455

(22) Filed: May 20, 2002

(65) Prior Publication Data

US 2003/0012279 A1    Jan. 16, 2003

Related U.S. Application Data

(60) Continuation of application No. 08/888,422, filed on Jul. 7, 1997, now Pat. No. 6,392,705, which is a division of application No. 08/714,447, filed on Mar. 17, 1997, now abandoned.

(51) Int. Cl.
  *H04N 7/12* (2006.01)
(52) U.S. Cl. .................. 375/240.12; 382/238
(58) Field of Classification Search ........... 375/240.12, 375/240.11, 240.14, 240.16, 240.21, 240.24, 375/240.22; 382/253, 238; 348/388.1; 341/200
  See application file for complete search history.

(56) References Cited

U.S. PATENT DOCUMENTS

| | | | |
|---|---|---|---|
| 4,816,914 A | 3/1989 | Ericsson |
| 5,144,425 A | 9/1992 | Joseph |
| 5,194,950 A | 3/1993 | Murakami et al. |
| 5,231,599 A | 7/1993 | Peters et al. |
| 5,235,419 A | 8/1993 | Krause |
| 5,331,637 A | 7/1994 | Francis |
| 5,349,383 A | 9/1994 | Parke |
| 5,367,385 A | 11/1994 | Yuan |
| 5,396,497 A | 3/1995 | Veltman |
| 5,418,568 A | 5/1995 | Keith |
| 5,418,571 A | 5/1995 | Ghanbari |
| 5,426,462 A | 6/1995 | Bui |
| 5,481,543 A | 1/1996 | Veltman |
| 5,487,167 A | 1/1996 | Dinallo |
| 5,502,727 A | 3/1996 | Catanzaro |
| 5,510,834 A | 4/1996 | Weiss |

(Continued)

OTHER PUBLICATIONS

Hung, Andy C. et al., "Error Resilient Pyramid Vector Quantization for Image Compression," Proceedings of 1st Int'l. Conference on Image Processing, IEEE Signal Process. Soc. vol. 1 Austin, TX, USA, 13-16 vol. 1994, pp. 583-587.

(Continued)

*Primary Examiner*—Gims Philippe
(74) *Attorney, Agent, or Firm*—Microsoft Corporation

(57) ABSTRACT

A multimedia compression system for generating frame rate scaleable data in the case of universally scaleable data. Universally scaleable data is scaleable across all of the relevant characteristics of the data (e.g., frame rate, resolution, and quality for video). The scaleable data generated by the compression system includes multiple additive layers for each characteristic across which the data is scaleable. For video, the frame rate layers are additive temporal layers, the resolution layers are additive base and enhancement layers, and the quality layers are additive index planes of embedded codes. Various techniques can be used for generating these layers (e.g., Laplacian pyramid decomposition or wavelet decomposition for generating the resolution layers; tree structured vector quantization or tree structured scalar quantization for generating the quality layers). The system further provides for embedded inter-frame compression in the context of frame rate scalability, and non-redundant layered multicast network delivery of the scaleable data.

9 Claims, 11 Drawing Sheets

U.S. PATENT DOCUMENTS

| | | | |
|---|---|---|---|
| 5,512,938 | A | 4/1996 | Ohno |
| 5,517,494 | A | 5/1996 | Green |
| 5,521,630 | A | 5/1996 | Chen |
| 5,521,918 | A | 5/1996 | Kim |
| 5,530,484 | A | 6/1996 | Bhatt |
| 5,557,749 | A | 9/1996 | Norris |
| 5,560,038 | A | 9/1996 | Haddock |
| 5,574,911 | A | 11/1996 | D'Angelo |
| 5,577,258 | A | 11/1996 | Cruz |
| 5,583,652 | A | 12/1996 | Ware |
| 5,585,852 | A | 12/1996 | Agarwal |
| 5,592,228 | A | 1/1997 | Dachiku |
| 5,594,911 | A | 1/1997 | Cruz |
| 5,596,493 | A | 1/1997 | Tone |
| 5,604,867 | A | 2/1997 | Harwood |
| 5,621,660 | A | 4/1997 | Chaddha et al. |
| 5,649,030 | A | 7/1997 | Normile et al. |
| 5,664,044 | A | 9/1997 | Ware |
| 5,673,265 | A | 9/1997 | Gupta et al. |
| 5,694,173 | A | 12/1997 | Kimura et al. |
| 5,708,473 | A | 1/1998 | Mead |
| 5,731,840 | A | 3/1998 | Kikuchi |
| 5,742,343 | A | 4/1998 | Haskell |
| 5,745,379 | A | 4/1998 | Lewis |
| 5,757,306 | A * | 5/1998 | Nomura ..................... 341/200 |
| 5,758,194 | A | 5/1998 | Kuzma |
| 5,768,533 | A | 6/1998 | Ran |
| 5,768,535 | A | 6/1998 | Chaddha |
| 5,784,572 | A | 7/1998 | Rostaker |
| 5,796,434 | A | 8/1998 | Lempel |
| 5,832,229 | A | 11/1998 | Tomoda |
| 5,844,613 | A | 12/1998 | Chaddha |
| 5,852,565 | A | 12/1998 | Demos |
| 5,859,667 | A * | 1/1999 | Kondo et al. .......... 375/240.14 |
| 5,864,366 | A | 1/1999 | Yeo |
| 5,874,986 | A | 2/1999 | Gibbon |
| 5,884,004 | A | 3/1999 | Sato |
| 5,886,733 | A | 3/1999 | Zdepski |
| 5,898,686 | A | 4/1999 | Virgile |
| 5,907,360 | A * | 5/1999 | Kessler et al. .......... 375/240.11 |
| 5,926,226 | A * | 7/1999 | Proctor et al. .......... 375/240.22 |
| 5,946,316 | A | 8/1999 | Chen et al. |
| 6,084,908 | A | 7/2000 | Chiang et al. |
| 6,157,656 | A | 12/2000 | Lindgren et al. |
| 6,160,846 | A | 12/2000 | Chiang et al. |
| 6,233,017 | B1 | 5/2001 | Chaddha |
| 6,337,881 | B1 | 1/2002 | Chaddha |
| 6,392,705 | B1 * | 5/2002 | Chaddha .................. 348/388.1 |
| 6,564,262 | B1 | 5/2003 | Chaddha |

OTHER PUBLICATIONS

Bolot, Jean-Chrysostome, et al., "Scalable Feedback Control for Multicast Video Distribution in the Internet," SIGCOMM 94 -Aug. 1994 London, England UK, copyright 1994 ACM, pp. 58-67.

Moura, Jose M.F., et al., "Retrieving quality video across heterogeneous networks—Video over Wireless," IEEE Personal Communications, Feb. 1996, pp. 44-54.

Birney, Keith A., et al., "On the Modeling of DCT and Subband Image Data for Compression," IEEE Transactions on Image Processing, vol. 4, No. 2, Feb. 1995, pp. 186-193.

Crutcher, Laurence, "The Networked Video Jukebox," IEEE Trans. Circuits Syst. Video Technol. (USA), vol. 4, No. 2, pp. 105-120.

Neogi, Raja, "Embedded Real-Time Video Decompression Algorithm and Architecture for HDTV Applications," ICAPP 95, IEEE First ICA/sub 3/PP IEEE 1st Int'l. Conference on Algorithms & Architectures for Parallel Processing (95TH0682-5), pp. 414-421, vol. 1, 1995.

"Quadtree Based Adaptive Lossy Coding of Motion Vectors".

"A Frame-work for Live Multicast of Video Streams over the Internet".

"Predictive Hierarchical Table-Lookup Vector Quantization with Quadtree Encoding".

Yavatkar et al., "Optimistic strategies for large-scale dissemination of multimedia information," Proceeding of the conference on Multimedia '93, 1993, pp. 13-20.

Amir, Elan, et al., "An Application Level Video Gateway," ACM Multimedia, Nov., 1995, pp. 1-10.

McCanne, Steven, et al., "vic: A Flexible Framework for Packet Video," ACM Multimedia, Nov. 1995 pp. 1-12.

Chaddha, N., et al., "An end to end software only scalable video delivery systems", Proceedings Networks and Operating System Support for Digital Audio and Video, pp. 130-141, Apr. 21, 1995.

* cited by examiner

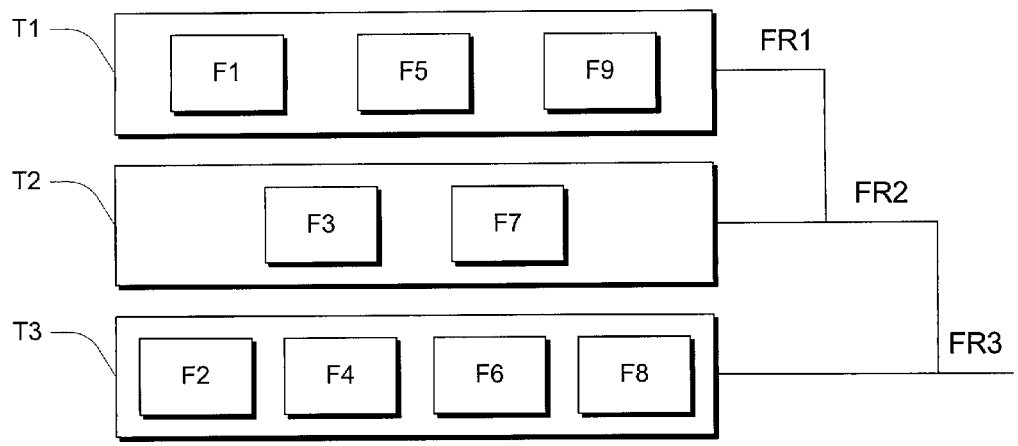
Fig. 2.a
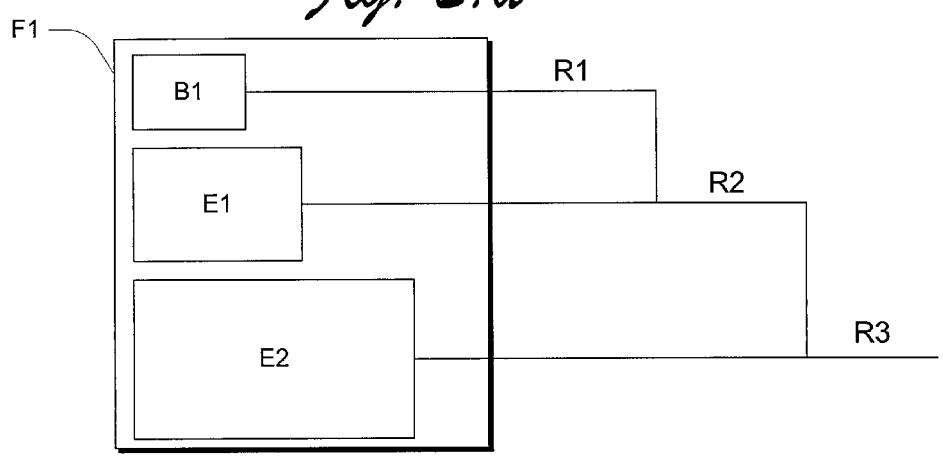
Fig. 2.b
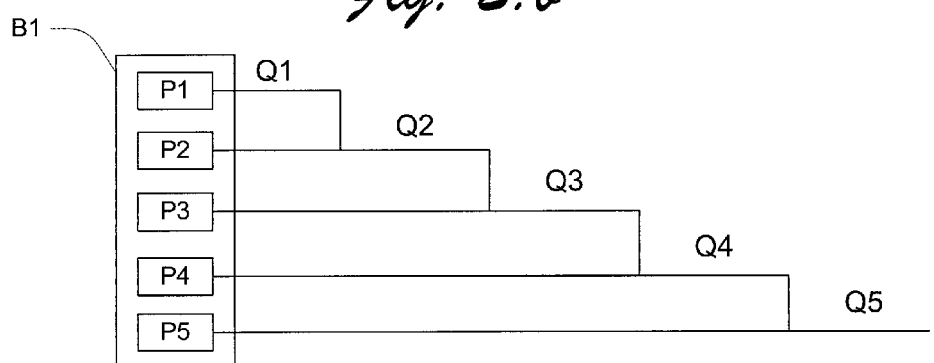
Fig. 2.c

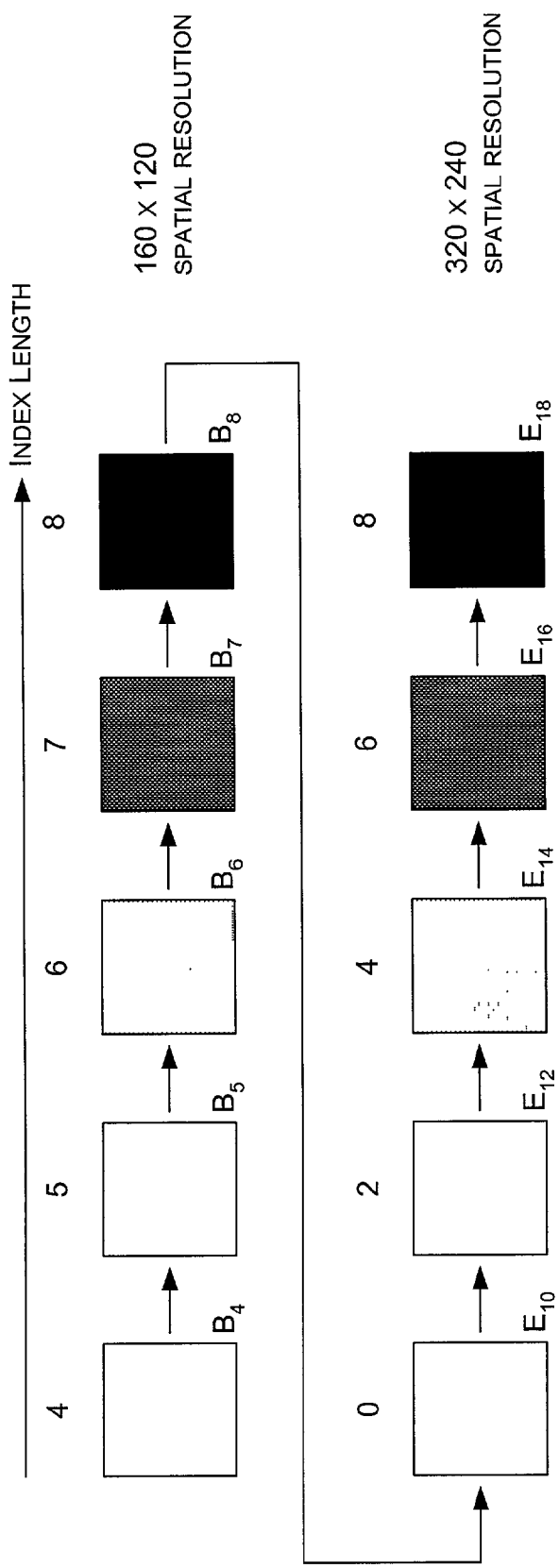
Fig. 10.1

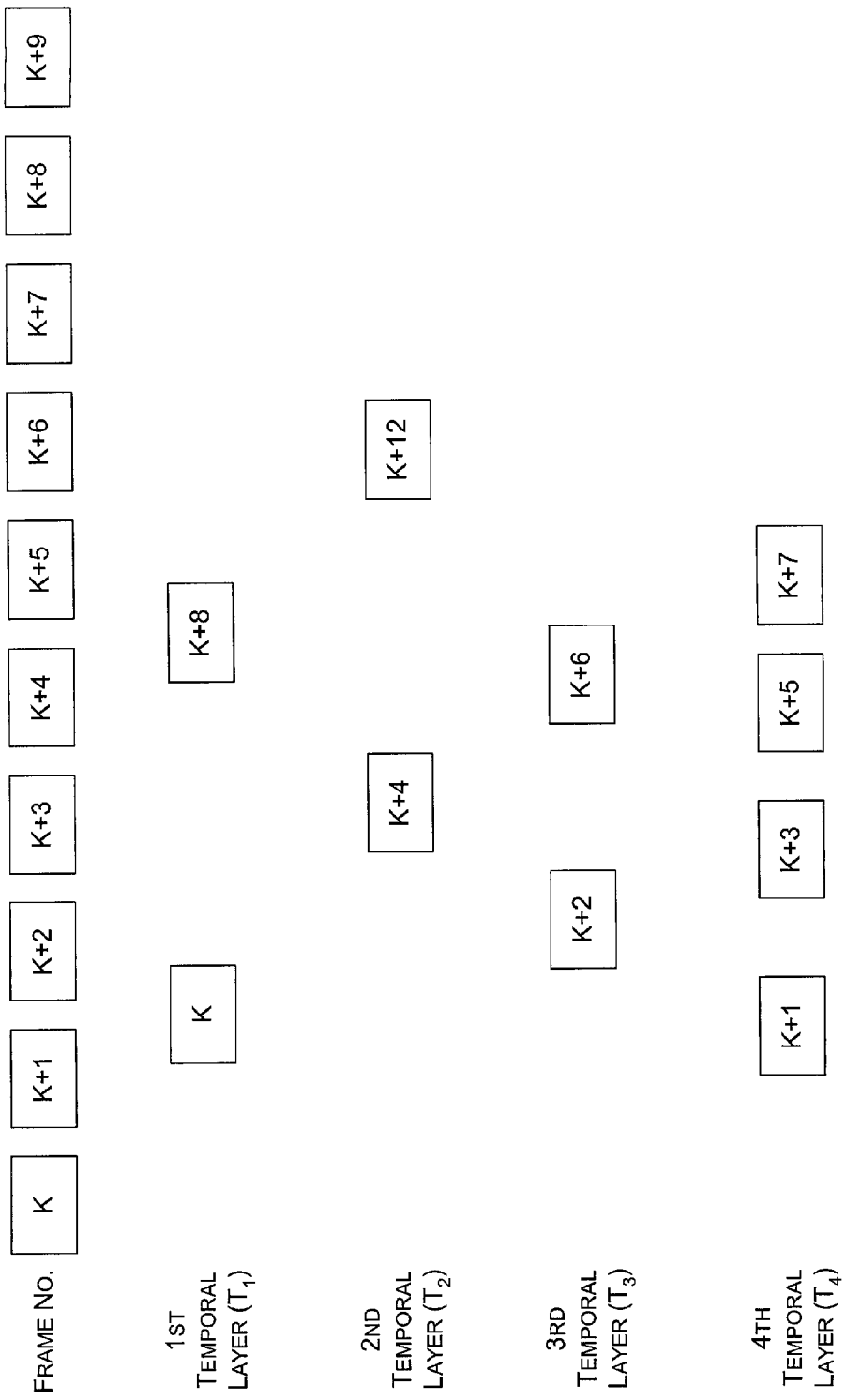
Fig. 10.2

MULTIMEDIA COMPRESSION SYSTEM WITH ADDITIVE TEMPORAL LAYERS

RELATED APPLICATIONS

This is a continuation of U.S. patent application Ser. No. 08/888,422, filed Jul. 7, 1997, now U.S. Pat. No. 6,392,705, which is a divisional of U.S. patent application Ser. No. 08/714,447, filed Mar. 17, 1997, now abandoned.

BACKGROUND OF THE INVENTION

The present invention relates to multimedia data processing. More particularly, it relates to the compression and network delivery of scaleably formatted multimedia data, for example, still and video images, speech, and music. A major objective of the present invention is to enhance streaming multimedia applications over heterogeneous networks. In a streaming multimedia application, multimedia data is packetized, delivered over a network, and played as the packets are being received at the receiving end, as opposed to being played only after all packets have been downloaded.

As computers are becoming vehicles of human interaction, the demand is rising for the interaction to be more immediate and complete. The effort is now on to provide such data intensive services as multicast video, on-demand video, and video collaboration, e.g., video conferencing and interactive video. These services are provided across networks.

The computer networks of today and of the foreseeable future are heterogeneous. This means that the computers on the network possess varying computational power, e.g., 40 MHz Intel 486 CPU or 150 MHz Intel Pentium CPU, on-chip media processing or none. It also means that the connections of the network can be of varying topologies, e.g., ATM, Ethernet, ISDN, POTS ("plain old telephone system"), or wireless, possessing varying bandwidth capacities.

Multimedia data consists of different kinds of data, including video images and audio signals. For each kind of multimedia data, a certain number of characteristics can be used to describe that data. For example, resolution (the amount of detail in the image) and quality (the fidelity of the image being displayed to the original image) can be used to describe still images; resolution, quality, and frame rate (the rate at which images change) can be used to describe video; and resolution (audio samples per second) and quality (the fidelity of the sample being played to the original sample) can be used to describe audio. These are not the only sets of characteristics which can be used to describe these different multimedia data types.

Multimedia is experienced by playing it. The enjoyability of multimedia playback, and therefore the usefulness, depends, in large part, upon the particular characteristics of the multimedia data. The more of a positive characteristic that the multimedia data possesses, the greater the enjoyment in playback of that data. With video, for example, playback is generally superior the higher the resolution, the quality, and the frame rate.

Multimedia data consumes space. The amount of space that data consumes depends upon the degree to which the multimedia possesses certain characteristics. With video, for example, the higher the resolution, the quality, and the frame rate, the more data is required to describe the video data. Thus, greater enjoyment of multimedia comes at the cost of greater data requirements.

Networks introduce a temporal element to data. Networks transmit data across the network connections over time. The amount of data that a network connection can transmit in a certain amount of time is the bandwidth of that connection.

The bandwidth required to transmit multimedia data over a network is a function of the characteristics of that data. With video, for example, the higher the resolution, the quality, and the frame rate, the higher the bandwidth required to transmit that video. Once the level of resolution, quality, and frame rate of video content is known, the bandwidth required to transmit that content can be calculated.

Often, bandwidth is the initial constraining factor in transmitting multimedia data. That is, the available bandwidth of a particular network connection is known. With bandwidth known, the level of the characteristics of multimedia data can, in theory, be adjusted to ensure that the data can be transmitted over the network. With video, for example, if bandwidth is known, the frame rate, resolution, and quality of that video can each, in theory, be raised or lowered to ensure the video can be transmitted over the bandwidth.

Networks transmit data across network connections to computers and other devices on the network. After multimedia data reaches a computer of the network, that computer can attempt to playback the data. In playing back that data, demands are placed upon the computational power of the computer. In general, the higher the level of characteristics of certain multimedia data, the more computational power required to playback that data. With video, for example, the higher the resolution, the higher the quality, and the higher the frame rate, the greater the computational power required to playback the video.

Often, computational power is the initial constraining factor in playing back multimedia data. That is, the available computational power of a particular computer is known. With computational power known, the level of the characteristics of multimedia data can, in theory, be adjusted to ensure that the data can be played back by that computer. With video, for example, if available computational power is known, the frame rate, resolution, and quality of that video can each, in theory, be raised or lowered to ensure the video can be played back on that computer.

In a heterogeneous network, differential bandwidth and computational power constraints preclude all network participants from experiencing the best possible multimedia data playback. In a "lowest common denominator" approach, multimedia data which can be processed by the network participant with the lowest bandwidth and computational power capabilities would be generated and delivered not only to that participant, but to all network participants. This is undesirable, however, because the network participants with greater bandwidth and computational power capabilities will receive sub-optimal data.

Alternative approaches, e.g., MPEG-1, generate separate data files, with different characteristic levels (e.g., resolution, frame rate, quality) targeted for different bandwidth/computational power capabilities. Each network participant receives near optimal multimedia data given that participant's bandwidth and computational power. This is undesirable, however, because multiple data files for each multimedia presentation consume a great deal of storage space. For systems which store many multimedia presentations, this approach quickly becomes infeasible.

The drawback of the multiple file approach is particularly apparent in the multicast case. With standard multicast, one data file or stream is transmitted by the server down a particular channel, and participants who subscribe to that channel receive that data. This minimizes the use of bandwidth because only one copy of the data traverses the network. If multiple redundant files or streams are used to transmit multimedia data down multiple multicast channels, bandwidth will be wasted, contrary to the very purpose of multicast.

Still other approaches provide limited scalability in a single file or stream approach. For example, in the case of video, quality scalability may be provided, but not frame rate or resolution scalability. These approaches are suboptimal in that network participants do not have full flexibility is tailoring the video presentation to their needs and desires.

In addition, where a compression system provides for scalability, complexity is often introduced which compels modifications to existing compression techniques. In particular, introducing frame rate scalability compels modifications to inter-frame compression techniques. One such inter-frame compression technique is conditional replenishment ("CR"). Another is motion compensation ("MC").

CR is an inter-frame video compression technique well known in the art. CR, like all inter-frame compression techniques, is used to achieve higher compression ratios. CR operates upon blocks of adjacent frames. A block is a contiguous subset of a frame. CR determines whether a block in the current frame should be encoded. "Forward" CR makes this determination by comparing the current block against the similarly positioned block in a previous frame. On the "condition" that the difference between the two blocks is less than some predetermined threshold value, the current block is not encoded; Instead it is "replenished" from the previous block. "Reverse" CR compares the current block against the corresponding block in a subsequent frame.

MC is another inter-frame compression technique well known in the art. MC can be considered a more general case of CR. Whereas forward CR compares the current block against only the corresponding block in a previous frame, forward MC compares the current block against more than one comparably sized blocks in that previous frame. If a matching block is found in the previous frame, MC generates a vector indicating the direction and distance describing the motion of the previous block, and error data describing changes in the previous block. MC can also operate at the frame level, as opposed to block level. As with reverse CR, reverse MC involves analyzing the current frame against a subsequent frame.

SUMMARY OF THE INVENTION

The present invention provides for compression and multicast network delivery of multimedia data in a format scaleable across one or more of the characteristics of that data. There are several aspects of the invention that are brought together to achieve optimal benefits, but which can be used separately.

One aspect of the present invention is a compression system for generating frame rate scaleable data for video. Frame rate scaleable data is scaleable across at least frame rate, and possibly additional video characteristics.

The present invention includes a compression system for generating universally scaleable data. Multimedia data can be described by a certain set of characteristics. Universally scaleable data is scaleable across that entire set. In the case of video, universally scaleable data is scaleable across frame rate, resolution, and quality. In the case of audio data, universally scaleable data is scaleable across resolution and quality. Universal scalability allows for flexible bandwidth and computational scalability. This makes universal scalability particularly useful for streaming multimedia applications over heterogeneous networks.

Another aspect of the present invention is a means for generating frame rate scaleable data which includes inter-frame compression. This results in an embedded inter-frame compression technique which achieves higher compression in addition to achieving frame rate scalability.

A final aspect of the present invention is multicast network delivery of frame rate scaleable data and universally scaleable data. Specifically, various layers of the scaleable data are divided and delivered over multiple multicast channels. Depending upon the bandwidth and computational power available to a network participant, that participant can subscribe to one or more multicast channels, thus optimizing the multimedia presentation to that participant.

It is not necessary for all aspects of the invention to be practiced together to attain advantages. However, when combined to yield a multimedia data compression and network delivery system, the result is optimally suited for streaming multimedia applications over heterogeneous networks. The multimedia data generated, delivered, and consumed by the compression and network delivery system is universally scaleable. In the case of video data, this means scalability in terms of frame rate, resolution and quality, and also in terms of bandwidth and computational power. The scaling can occur at any point in the system, including at the generation of the multimedia data, in transmission of the data over a network, or during playback of the data. Universal scalability allows for efficient and non-redundant storage of multimedia data, optimized and non-redundant multicast delivery of that data, and tradeoff among the multimedia characteristics (e.g., frame rate, resolution, and quality), and therefore bandwidth and computational power, to achieve an optimal combination of data playback, network traffic, and computational load. For example, bandwidth consumption of streamed video is significant concern for some network administrators. Universal scalability allows these network administrators to restrict bandwidth usage of video streams to a certain limit. With this limit set, the data delivered can be optimized for frame rate, resolution, and quality, given the computational power of the recipient's computer. These and other features and advantages of the invention are apparent from the description below with reference to the following drawings.

BRIEF DESCRIPTION OF THE DRAWINGS

FIG. 2 is a schematic illustration of universally scaleable video data in accordance with the present invention.

FIG. 10 is a schematic illustration of arrangement of packets in accordance with the present invention.

DESCRIPTION OF THE PREFERRED EMBODIMENTS

Figure 1:
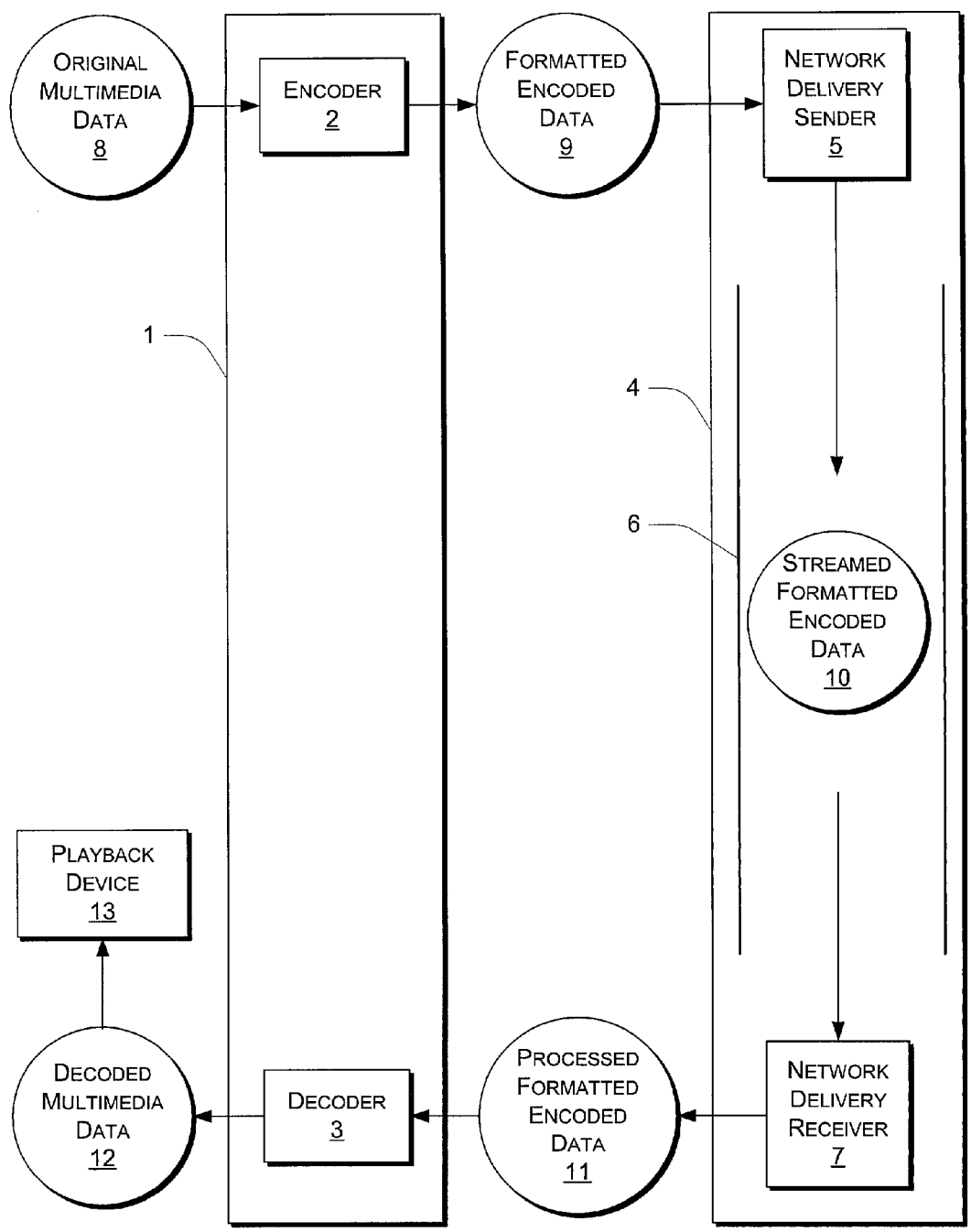
FIG. 1 is a schematic illustration of a compression and network delivery system in accordance with the present invention.

Referring now to FIG. 1, a Compression System 1 and Network Delivery System 4 are provided in accordance with the present invention. Compression System 1 comprises Encoder 2 and Decoder 3. Network Delivery System 4 comprises Network Delivery Sender 5, Network 6, and Network Delivery Receiver 7.

Encoder 2 accepts as input Original Multimedia Data 8 and generates as output Formatted Encoded Data 9. Original Multimedia Data 8 comprises multimedia data, including still image, video, or audio. Original Multimedia Data 8 is in a standard uncompressed digital format. With still image or video, for example, the data could be in the YUV 4:2:2 format. Original Multimedia Data 8 can exist in the form of a static file, or as a dynamic stream. Formatted Encoded Data 9 is a compressed representation of Original Multimedia Data 8, and it is formatted for optimized delivery over heterogeneous networks.

Network Delivery Sender 5 accepts as input Formatted Encoded Data 9, and generates as output Streamed Formatted Encoded Data 10. Network Delivery Sender 5 streams Streamed Formatted Encoded Data 10 over Network 6. Network Delivery Sender 5 can stream this data for any purpose, including video-on-demand, multicast, and video-conferencing.

Network 6 transports Streamed Formatted Encoded Data 10 to Network Delivery Receiver 7. Network Delivery Receiver 7 generates as output Processed Formatted Encoded Data 11. Processed Formatted Encoded Data 11 comprises either all of Streamed Formatted Encoded Data 10, or a subset of that data.

Decoder 3 accepts as input Processed Formatted Encoded Data 11 and generates as output Decoded Multimedia Data 12. Decoded Multimedia Data 12 is a post-compression/decompression representation of Original Multimedia Data 8. Decoded Multimedia Data 12 is delivered to Playback Device 13 which plays the Decoded Multimedia Data 12. In the case of still image content, this would comprise displaying the image. In the case of audio content, this would comprise playing the audio content. In the case of video content, this would comprise playing the video content.

In general, the different components described above can be distributed across different hardware units.

The compression and network delivery system of FIG. 1 generates and processes universally scaleable data, including frame rate scaleable data. The data can be of any multimedia type, including still images, video, and audio. Universal scalability means that the multimedia data is scaleable across all relevant characteristics of the data.

FIG. 2 is a hierarchical depiction of universally scaleable data for video. Formatted Encoded Data 9, Streamed Formatted Encoded Data 10, and Processed Formatted Encoded Data 11 in FIG. 1 could be video data in the format depicted in FIG. 2. FIG. 2.*a* depicts the frame rate scaleable aspect of the universally scaleable data. FIG. 2.*b* depicts the resolution scaleable aspect of that data. FIG. 2.*c* depicts the quality scaleable aspect of that data.

FIG. 2.*a* depicts Frames F1–F9. Frames F1–F9 are nine sequential image frames from the video data Frame F2 directly succeeds Frame F1, Frame F3 directly succeeds Frame F2, and so on. In accordance with the present invention, Frames F1–F9 are rearranged into Temporal Layers T1, T2, and T3. Temporal Layer T1 comprises every fourth frame, namely Frames F1, F5, and F9. Temporal Layer T2 comprises Frames F3, and F7. Temporal Layer T3 comprises Frames F2, F4, F6, and F8.

The temporal layers are additive. This means that layers are combined "first-to-last" to achieve successively higher frame rates. Thus, the first temporal layer achieves a certain frame rate. A second, higher frame rate, is achieved by combining the second temporal layer with the first. A third, and higher still frame rate is achieved by combining the third temporal layer with the first and second, and so on. Conversely, the additive layers are dropped "last-to-first". If the n-th temporal layer has been dropped, then temporal layers (n+1), (n+2), etc., have been dropped.

Referring now to FIG. 2, Temporal Layer T1, standing alone, provides for Frame Rate FR1. Temporal Layer T1 combined with Temporal Layer T2 comprises every second frame, namely Frames F1, F3, F5, F7, and F9, and provides for Frame Rate FR2 which is higher than Frame Rate FR1. Temporal Layer T1 combined with Temporal Layers T2 and T3 comprises every frame, namely Frames F1–F9, and provides for Frame Rate FR3 which is higher than Frame Rate FR2.

At any point in the process of encoding, delivering, and playing back the video frames, temporal layers can be dropped to achieve a desired frame rate. At the encoding stage, if Frame Rate FR2 is desired, for example, only Temporal Layers T1 and T2 need be generated. Temporal Layer T3 is not generated. Similarly, if the video content was encoded to provide for Frame Rate FR3, and Frame Rate FR1 is desired, Temporal Layers T2 and T3 can be dropped during network delivery or playback.

In general, there can be any number of temporal layers and any number of frames in each temporal layer. In the preferred embodiment, there are four temporal layers. The first temporal layers comprises every ninth frame beginning with the first; the second layer comprises every ninth frame beginning with the fifth; the third layer comprises the remaining odd-numbered frames; and the fourth layer comprises the even-numbered frames. The first temporal layer provides for a frame rate of 3.75 frame per second ("fps"); the first and second layers combined correspond to a frame rate of 7.5 fps; the first, second, and third layers combined correspond to a frame rate of 15 fps; and all four layers combined correspond to a frame rate of 30 fps.

FIG. 2.*b* depicts one representative frame from FIG. 2.*a*, in this case, Frame F1. Frame F1 comprises Base Layer B1, Enhancement Layer E1, and Enhancement Layer E2.

As with the temporal layers of FIG. 2.*a*, the base and enhancement layers of FIG. 2.*b* are additive (combining layers first-to-last achieves successively higher resolutions). Base Layer B1, the first layer, provides for Resolution R1, the smallest, or base resolution for Frame F1. Resolution R1 comprises the smallest number of picture elements ("pixels") of any resolution for Frame F1. Enhancement Layer E1 comprises certain data which, when combined with Base Layer B1 in a particular way, provides for Resolution R2. Resolution R2 is higher than Resolution R1. Similarly, Resolution R3, which is higher than both Resolution R1 and Resolution R2. Resolution R3 is obtained by combining Base Layer B1 with Enhancement Layers E1 and E2 in a particular way.

Enhancement Layers E1 and E2 typically comprise error or difference data. The error or difference data is generated to take advantage of the redundancy across different resolutions. Enhancement Layer E1 is obtained by subtracting an up-sampled and filtered version of R1 from R2. Up-sampling and filtering are techniques well known in the art.

At any point in the process of encoding, delivering, and playing back the video frames, layers can be dropped to achieve a desired resolution. At the encoding stage, if Resolution R2 is desired, only Base Layer B1 and Enhancement Layer E1 are generated. Enhancement Layer E2 is not generated. Similarly, if the video content was encoded to provide for Resolution R3, and Resolution R1 is desired, Enhancement Layers E1 and E2 can be dropped during network delivery or playback.

In general, there can be any number of base and enhancement layers. In the preferred embodiment, there is one base layer and two enhancement layers. The resolution of the base layer is 160×120 pixels; the second resolution level is 320×240 pixels; and the third resolution level is 640×480 pixels.

FIG. 2.$c$ depicts one representative layer from FIG. 2.$b$, in this case, Base Layer B1. Base Layer B1 comprises Index Planes P1–P5. Index Plane P1, the first plane, provides for Quality Q1, the lowest quality for Base Layer B1. Index Plane P1 is an encoded representation of Base Layer B1. For example, Index Plane P1 could comprise a series of codes. Each of these codes would represent one part of Base Layer B1.

The number of bits in a code determines how much information that code can represent. The more bits in a code, the more information that code can represent. Additionally, the more bits in a code, the more accurate can be the code's representation of what it encodes.

Index Plane P1 represents Base Layer B1 with Quality Q1. Quality Q1 is the fidelity that the decoded representation of Index Plane P1 bears toward the original Frame F1. Quality is measured typically by Signal-to-Noise-Ratio (SNR). If Index Plane P1 comprises a series of codes n bits long, then Quality Q1 is the level of quality afforded by n-bit encoding.

As with the temporal layers of FIG. 2.$a$, and the base and enhancement layers of FIG. 2.$b$, the index planes are additive (combining index planes first-to-last achieves successively higher quality). Index Plane P2, when combined with Index Plane P1, results in an encoding of Base Layer B1 with Quality Q2. If Index Plane P1 comprises a series of codes n bits long, and Index Plane P2 comprises a series of codes m bits long, then combining the two index planes will result in a series of codes n+m bits in length. Because the n+m-bit codes are longer than the n-bit codes, Quality Q2 can and should be higher than Quality Q1.

Index Planes P3–P5 are similarly combined with all of the preceding index planes to generate codes of increasing length, and thereby increasing Quality Q3–Q5.

In general, there can be any number of index planes. In the preferred embodiment, there are three index planes. The initial index plane comprises a series of codes 6 bits in length; the second plane comprises a series of codes 3 bits in length; and the third plane also comprises a series of codes 3 bits in length. Each code corresponds to a particular block in the frame.

Collectively, the index planes correspond to a series of embedded codes. A code represents a thing. With an embedded code, a subset of the code will represent something else close that thing. For example, say an n-bit embedded code represents image I. Then the first (n−1) bits of that code will represent an image I' which is an approximation of I.

In the preferred embodiment, the embedded codes are fixed in length rather than variable in length. Because the compression system generates fixed-length codes rather than variable-length codes during generation of the index planes, the system represents a wide range of video data well, rather than representing a limited range very well and the remainder poorly. Higher compression ratios are achieved later in the system by run-length coding the fixed-length codes of the index planes.

FIG. 2 depicts universally scaleable video data. Universal scalability can be used for other kinds of multimedia data, including still images and audio. With still images, resolution and quality are characteristics for which the scaleable representations depicted in FIG. 2.$b$ and FIG. 2.$c$, respectively, can be used. Similarly, with audio, the concept of frame rate is generally thought not to apply. However, sampling rate (resolution) and amplitude (quality) do apply. The scaleable representations depicted in FIG. 2.$b$ and FIG. 2.$c$, respectively, can be used for these two characteristics.

Figure 3:
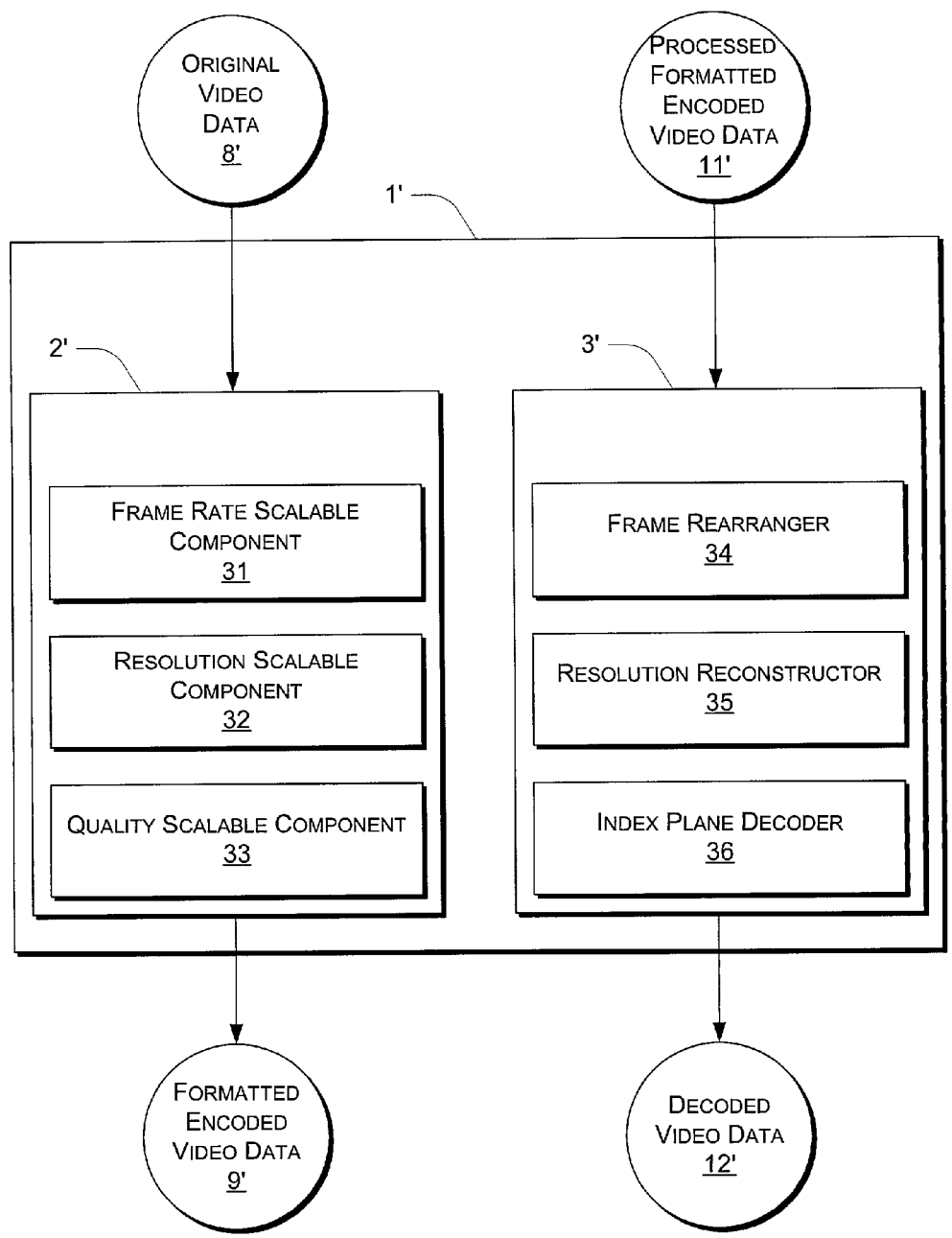
FIG. 3 is a schematic illustration of a compression system in accordance with the present invention.

FIG. 3 depicts a Compression System 1' from FIG. 1 which processes video data. Compression System 1' comprises Encoder 2' and Decoder 3'. Encoder 2' generates universally scaleable data, or frame rate scaleable video data. Decoder 3' processes this data.

Encoder 2' includes Frame Rate Scaleable Component 31, and optionally includes Resolution Scaleable Component 32 and Quality Scaleable Component 33. Frame Rate Scaleable Component 31 rearranges the frames of Original Video Data 8 into temporal layers of the frame rate scaleable data format represented in FIG. 2.$a$. If a particular maximum frame rate is desired, Frame Rate Scaleable Component 31 can drop temporal layers unnecessary to achieve that frame rate.

For an individual frame of Original Video Data 8, Resolution Scaleable Component 32 generates base and enhancement layers of the resolution scaleable data format represented in FIG. 2.$b$. In the preferred embodiment, the method of generating these layers is Laplacian pyramid decomposition, a technique well known in the art. Laplacian pyramid decomposition performs sequenced actions upon these layers, including filtering and down-sampling, up-sampling and filtering. If a particular maximum resolution is desired, Resolution Scaleable Component 32 can fail to generate enhancement layers unnecessary to achieve that resolution.

Other methods for generating the base and enhancement layers to achieve resolution scalability include wavelet and subband decompositions. These techniques are also well known in the art.

For an individual layer generated by Resolution Scaleable Component 32, Quality Scaleable Component 33 generates index planes of the quality scaleable data format represented in FIG. 2.$c$. If a particular maximum quality is desired, Quality Scaleable Component 33 can fail to generate index planes unnecessary to achieve that quality.

In the preferred embodiment, to generate a particular enhancement layer, all of the index planes for the preceding layers are generated. This is because the highest quality enhancement layers generated by the Laplacian pyramid decompositions are obtained by using the best quality representations of the preceding layers.

Quality Scaleable Component 33 encodes (compresses) pixel data. The result of this encoding is the generation of a collection of codes. This collection of codes comprise the index planes. The index planes are enabled by the fact that these code are embedded.

A number of different methods are known in the art for generating embedded codes. These include tree-structured scalar quantization, tree-structured vector quantization (TSVQ), and other progressive scalar and vector quantization coding schemes.

Frame Rate Scaleable Component 31, Resolution Scaleable Component 32, and Quality Scaleable Component 33 can operate in any sequence, including in an interleaved manner. For example, if the Resolution Scaleable Component 32 performs Laplacian pyramid encoding, the Quality Scaleable Component 33 will generate index planes in connection with the Laplacian pyramid decomposition.

Decoder 3' accepts as input Processed Formatted Encoded Video Data 11'. Decoder 3' includes Frame Rearranger 34, and optionally includes Resolution Reconstructor 35 and Index Plane Decoder 36. Frame Rearranger 34 rearranges the video frames into original sequential order. If a frame rate lower than that provided by Processed Formatted Encoded Video Data 11' is desired, temporal layers of frames can be dropped which are unnecessary for achieving the desired frame rate. This situation could arise, for example, when computational power is insufficient to operate Decoder 3' in real-time.

For each frame, Resolution Reconstructor 35 constructs an image of the resolution provided for in the data. Resolution Reconstructor 35 performs the complement to the action performed by Resolution Scaleable Component 32. For example, if Resolution Scaleable Component 32 performed Laplacian pyramid decomposition, Resolution Reconstructor 35 will perform Laplacian pyramid composition. If a resolution lower than that provided by Processed Formatted Encoded Video Data 11' is desired, enhancement layers can be dropped which are unnecessary for achieving the desired resolution.

Index Plane Decoder 36 decodes the codes which comprise the index planes. Index Plane Decoder 36 performs the decode complement to the encode performed by Quality Scaleable Component 33. For example, if Quality Scaleable Component 33 performed TSVQ encoding, Index Plane Decoder 36 will perform TSVQ decoding.

If quality lower than that provided by Processed Formatted Encoded Video Data 11' is desired, index planes can be dropped which are unnecessary for achieving the desired quality.

Figure 4:
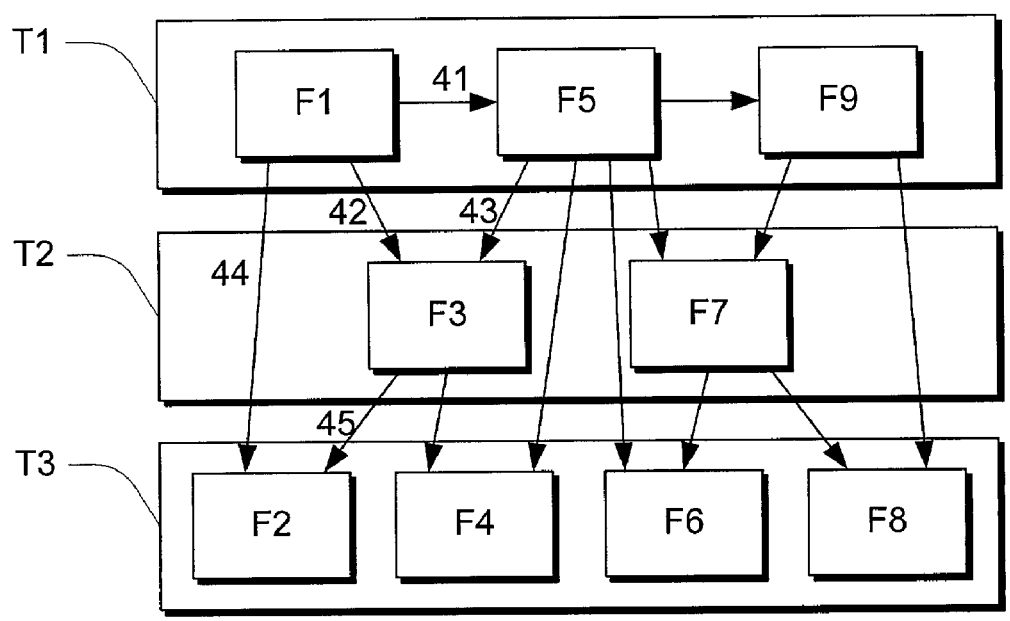
FIG. 4 is a schematic illustration of an embedded inter-frame compression system for achieving frame rate scalability and additional compression in accordance with the present invention.

FIG. 4 depicts a technique for embedded inter-frame compression in accordance with the present invention. Embedded inter-frame compression is inter-frame compression combined with frame rate scalability. Frame rate scaleable data rearranges video frames into temporal layers of frames which are additive, and which can be dropped during network delivery or playback. Embedded inter-frame compression modifies conventional inter-frame compression to take into account these aspects of frame rate scaleable data.

FIG. 4 depicts Frames F1–F9. Frames F1–F9 are nine sequential image frames from the video content arranged into Temporal Layers T1, T2, and T3 in accordance with the present invention. Inter-frame compression is performed on all pairs of adjacent frames in Temporal Layer T1.

For example, Forward Inter-Frame Compression 41 is performed on Frame F5 against Frame F1. In the case of CR, this means that each block of Frame F5 is compared with the corresponding block of Frame F1. If the blocks are sufficiently close, a code, for example X2, is generated for that block of Frame F5 to indicate that the block should be replenished from the previous block. Otherwise, another code, for example X1, would be generated indicating that no replenishment is to occur. In that case, the block would be quantized and transmitted.

For the frames in Temporal Layers T2 and T3, both forward inter-frame compression and reverse inter-frame compression are optionally performed. Reverse inter-frame compression is the same as forward inter-frame compression, except that the current frame is compared against a subsequent frame, as opposed to a previous frame. In the case of CR, reverse CR compares blocks in the current frame against blocks in a subsequent frame, as opposed to a previous frame.

In the preferred embodiment, for each frame in the temporal layers beyond the initial layer, inter-frame compression is performed against the frame in any higher temporal layer which was previous to that frame in the original video, but closest in proximity. Reverse inter-frame compression is performed against that frame in the higher temporal layer which was subsequent to that frame in the original video, but closest. Performing inter-frame compression against only higher layers alleviates the problem of the network delivery or playback systems throwing away layers. In accordance with the present invention, temporal layers are discarded starting from the bottom layer and moving up.

For example, Forward Inter-Frame Compression 42 is performed on Frame F3 of Temporal Layer T2 against Frame F1 of Temporal Layer T1. Reverse Inter-Frame Compression 43 is performed on Frame F3 against Frame F5 of Temporal Layer T1. Similarly, Forward Inter-Frame Compression 44 is performed on Frame F2 of Temporal Layer T3 against Frame F1 of Temporal Layer T1. Reverse Inter-Frame Compression 45 is performed on Frame F2 against Frame F3 of Temporal Layer T2.

In the case of CR, for a block of a frame in Temporal Layers T2 or T3, a code, for example X3, is generated if forward CR failed but reverse CR succeeded. If forward CR succeeds, code X2 is generated. If both forward CR and reverse CR fail, code X1 is generated. In that case, the block is quantized and transmitted.

At decode time, the appearance of code X2 or X3 for a block means that replenishment is to occur. Code X2 means that replenishment is to occur from the block in the previous frame against which forward CR was performed. Code X3 means that replenishment is to occur from the block in the subsequent frame against which reverse CR was performed.

Reverse inter-frame compression introduces delay at the decoder and increases computational complexity at the encoder. For these reasons, reverse inter-frame compression can be performed all the time, or only for some frames but not others, or only for some blocks but not others, or not at all. The same is true for forward inter-frame compression.

In the preferred embodiment, embedded CR is performed on 8×8 blocks within 320×240 resolution. The same CR map is used for all resolutions. Thus, CR is not performed on the 160×120 or 640×480 resolution. Blocks for which CR indicates for some time that replenishment will suffice are transmitted as background blocks. This reduces the error propagation due to packet loss and also provides background blocks to receivers who join multicast session at different times. In addition, the CR codes (i.e., X1, X2, and X3) are run-length coded to reduce the transmission overhead for them.

Embedded CR achieves higher compression rates than conventional CR, but consumes more computational power. These effects are attributable to the fact that embedded CR performs CR in two directions rather than just one.

Figure 5:
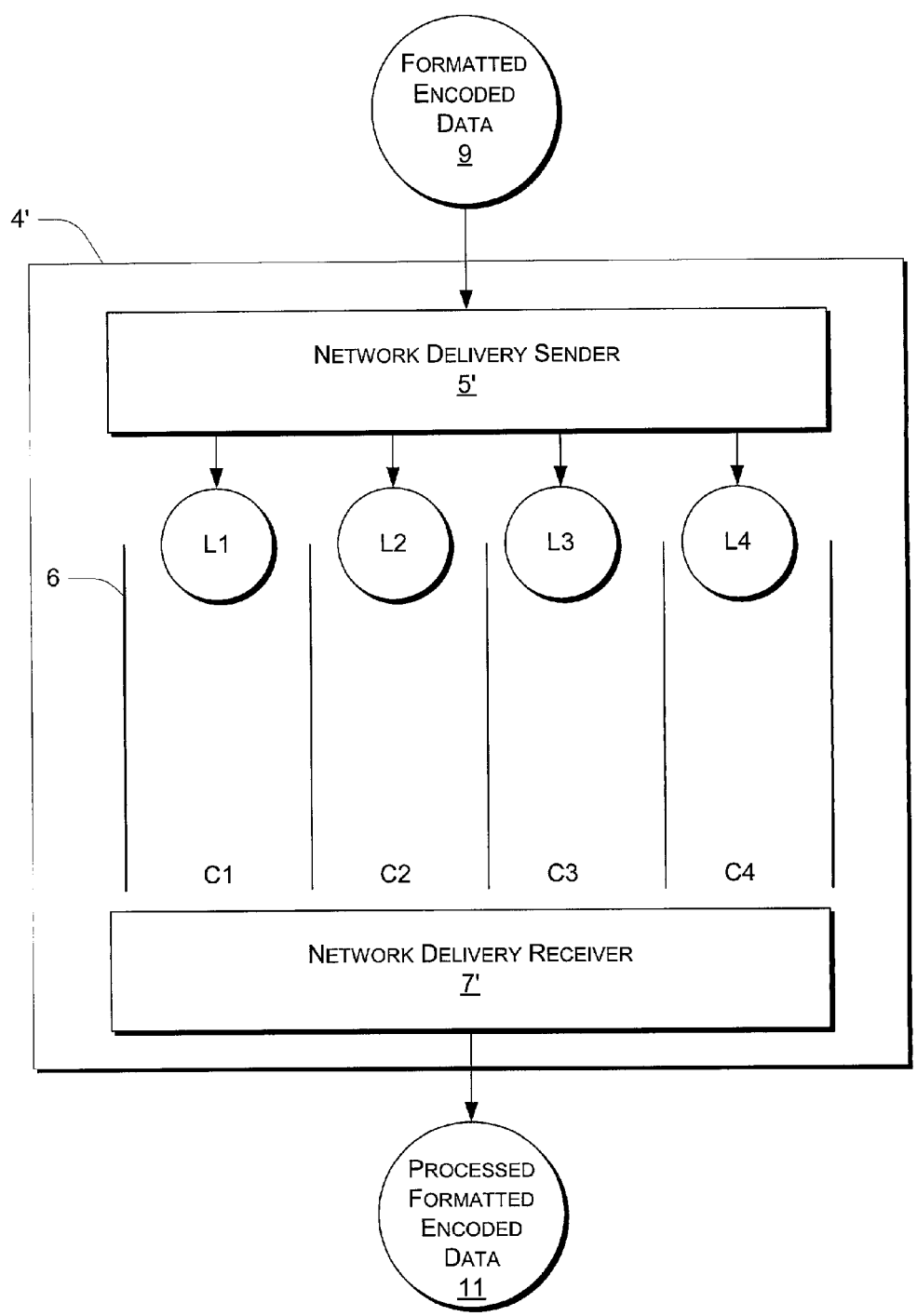
FIG. 5 is a schematic illustration of a multicast network delivery system in accordance with the present invention.

FIG. 5 depicts a Network Delivery System 4' from FIG. 1 which delivers universally scaleable multimedia data, including frame rate scaleable data. Network Delivery System 4' comprises Network Delivery Sender 5', Network 6, and Network Delivery Receiver 7'.

Network Delivery Sender 5' accepts as input Formatted Encoded Data 9. Network Deliver Sender 5' divides this data into Layers L1, L2, L3, and L4, and sends these layers down Channels C1, C2, C3, and C4, respectively. Channels C1–C4 are different multicast groups.

Layers L1–L4 are different layers of the data. The data is frame rate scaleable or universally scaleable. The data comprises multiple layers for each characteristic over which it is scaleable. These multiple layers comprise a first layer, and subsequent layers. In general, the layers are additive. In some cases they might be redundant. For additive layers, in terms of frame rate, the data is divided into temporal layers. In terms of resolution, the data is divided into base and enhancement layers. In terms of quality, the data is divided into index planes.

Layers L1–L4 can comprise any allocation of the various layers of the data. In the preferred embodiment, Layer L1 comprises at least the base layer for each characteristic (i.e., the first temporal layer, the base resolution layer, and the first index plane). Subsequent data layers are allocated throughout Layers L1–L4 in sequential order. For example, Layer L1 could comprise Temporal Layer T1, Base Layer B1, and Index Plane P1; Layer L2 could comprise Temporal Layers T2 and T3, Enhancement Layer E1, and Index Planes P2 and P3; and so on.

Network Delivery Receiver 7' receives Layers L1–L4 from Channels C1–C4. Each channel consumes a particular bandwidth. Network Delivery Receiver 7' is aware of the bandwidth capabilities and desires of one or more ultimate recipients of the data. To a recipient, Network Delivery Receiver 7' sends one or more layers. In the preferred embodiment, Network Delivery Receiver 7' sends to a recipient as many layers, from left to right, as the recipient's bandwidth and desire allows.

Set Forth Below is a Detailed Description of a Specific Frame-Work in Accordance With the Present Invention for Live Multicast of Video Streams Over the Internet:

The overall system combines a scaleable video compression algorithm, a cheap software only real-time video encoder and decoder, and a network unit. The scaleable compression algorithm produces an embedded bit-stream to support decoders with various spatial and temporal resolutions. Bandwidth scalability with a dynamic range from a few Kbps to several Mbps is provided. The subjective quality of compressed frames improves significantly by the use of perceptual distortion measures. For cheap software only encoding and decoding we use hierarchical table-lookup vector quantization. Multiple multicast groups are used for the delivery of the scaleable streams over the Internet.

This section presents a frame-work for live multicast of video streams over heterogeneous networks consisting of ATM, Ethernet, ISDN, and wireless networks having various bandwidths, and hosting decoders with various spatial and temporal resolutions, reproduction alphabets, limits on computation, etc. The overall system requirements are:

Rate or Bandwidth Scalability: The system should support a range of bandwidths (e.g., 10 Kbps–10 Mbps).

Resolution Scalability: The system should support decoders with different display sizes (e.g., 640×480, 320×240, 160×120).

Frame-rate Scalability: The system should support decoders with different frame rates (e.g., 1 to 30 fps).

Cheap Computational Complexity: The system should use software only real-time video encoding and decoding algorithms with extremely cheap computational complexity.

Joint-Source Channel Coding: The system should also allow easy joint-source channel coding and prioritized layered coding over heterogeneous networks.

Most popular existing compression algorithms do not have the desired properties of scaleable compression. Compression standards like MPEG-2 offer scalability to a limited extent, but lack the dynamic range of bandwidth. Recently there has been some work on scaleable compression by Taubman and Zakhor [1], Shapiro [2]. Taubman and Zakhor [1] use 3-d subband coding with layered progressive scalar quantization and adaptive arithmetic coding. Shapiro [2] uses zero-tree scalar quantization of wavelet coefficients with adaptive arithmetic coding. These algorithms perform well in rate-distortion sense but are not amenable to real-time software only encoding and decoding of video on general purpose workstations. Chaddha et al. [3] achieve scaleable compression using arbitrary block transforms, lapped orthogonal transforms, or wavelet transforms; and use tree-structured vector quantization with a perceptually based input-weighted-squared error distortion measure.

McCane and Vetterli [6] presented a wavelet based algorithm for joint source/channel coding of multicast packet video. In their work they use a receiver-adaptation based approach for multicast packet video. They are deploying their work in an existing Internet remote conferencing application, VIC [7]. A similar idea for multiple multicast groups (MMG) has been presented in [8].

In this paper we describe live multicast of video streams over the Internet. The overall framework combines a scaleable compression algorithm, network unit, software only real-time encoder and decoder of video streams, and a prototype to deploy the different components. Our system uses a Laplacian pyramid coding algorithm for providing resolution scalability. Each layer in the pyramid is coded using hierarchical table-lookup vector quantization designed with perceptually weighted distortion measures [9]. For exploiting temporal redundancy and providing frame rate scalability we use an embedded condition replenishment algorithm which is implemented by table-lookups. For delivery of such streams over the Internet we use a strategy similar to [6, 8] of receiver-based adaptation. This is achieved by sending the embedded video stream on multiple multicast groups and allowing the receiver to join/leave groups based on a control algorithm.

An efficient algorithm for video compression based on hierarchical vector quantization of wavelet coefficients performed with table-lookups has also been proposed in [10]. However there is no frame-rate scalability, no resolution scalability and the stream is not embedded in their work [10]. Moreover there is no network transport mechanism provided.

Problem Statement

The aim of this work is to provide scaleable live-video delivery over a wide range of different networks (ATM, ISDN, Ethernet). The target decoder system should be able to define the spatial resolutions (e.g. 160×120, 320×240 pixels) and temporal resolution (e.g. 3.75, 7.5, 15, 30 frames per seconds). Bandwidth scalability, with a dynamic range of the video data from 10 Kbps to 10 Mbps, is also a requirement. The video encoding should output an embedded stream from which different streams at different resolutions (both spatial and temporal) and different data rates can be extracted depending on the decoder capabilities and requirements. The software-based video encoder and decoder should be able to operate in real-time using minimal CPU resources on a range of systems. The system should also allow easy joint-source channel coding and prioritized layered coding over heterogeneous networks.

Scaleable Compression Algorithm

Figure 6:
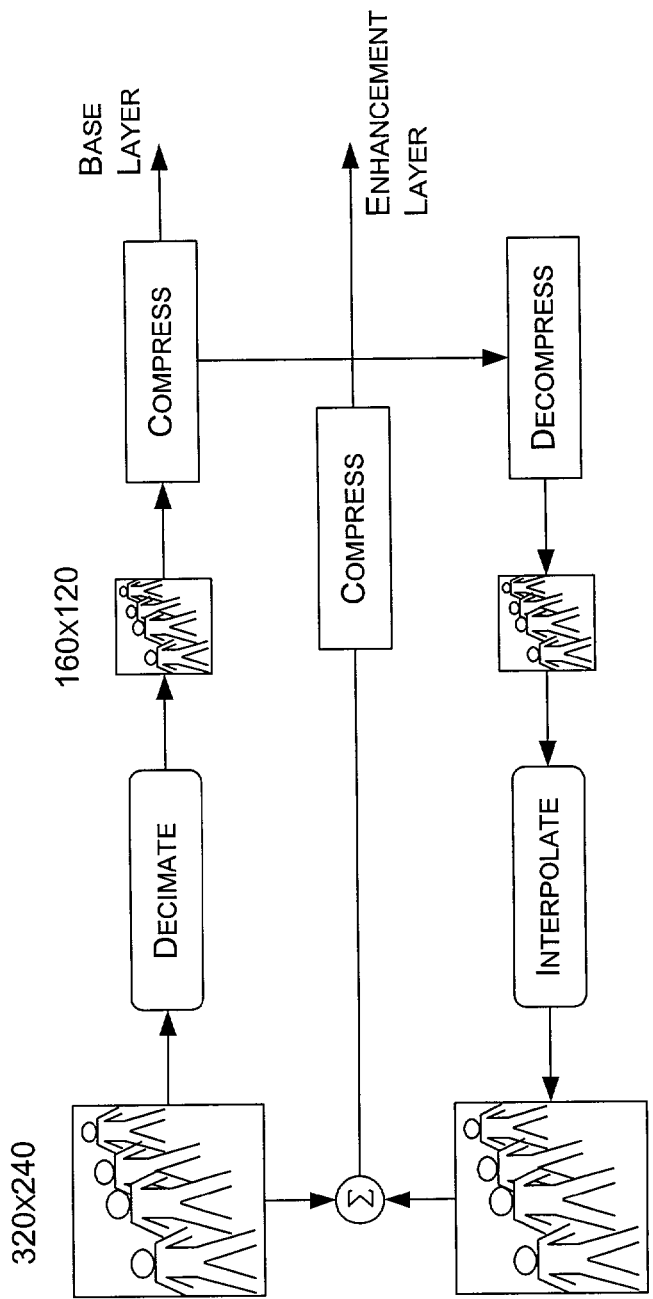
FIG. 6 is a schematic illustration of the Laplacian pyramid decomposition algorithm.

The video coding algorithm is based on a Laplacian pyramid decomposition [5] (see FIG. 6). The original 320× 240 image is decimated (filtered and sub-sampled) to 160× 120 pixels for encoding. The base 160×120 is compressed and then decompressed. The resulting decompressed image is up-sampled and subtracted from the 320×240 pixel image to give an error image. The error image is compressed. Thus the encoding stage consists of two image resolutions. The base layer transmitted has the compressed data for 160×120 pixels image. The enhancement layers transmitted has the error data for the 320×240 image.

Figure 7:
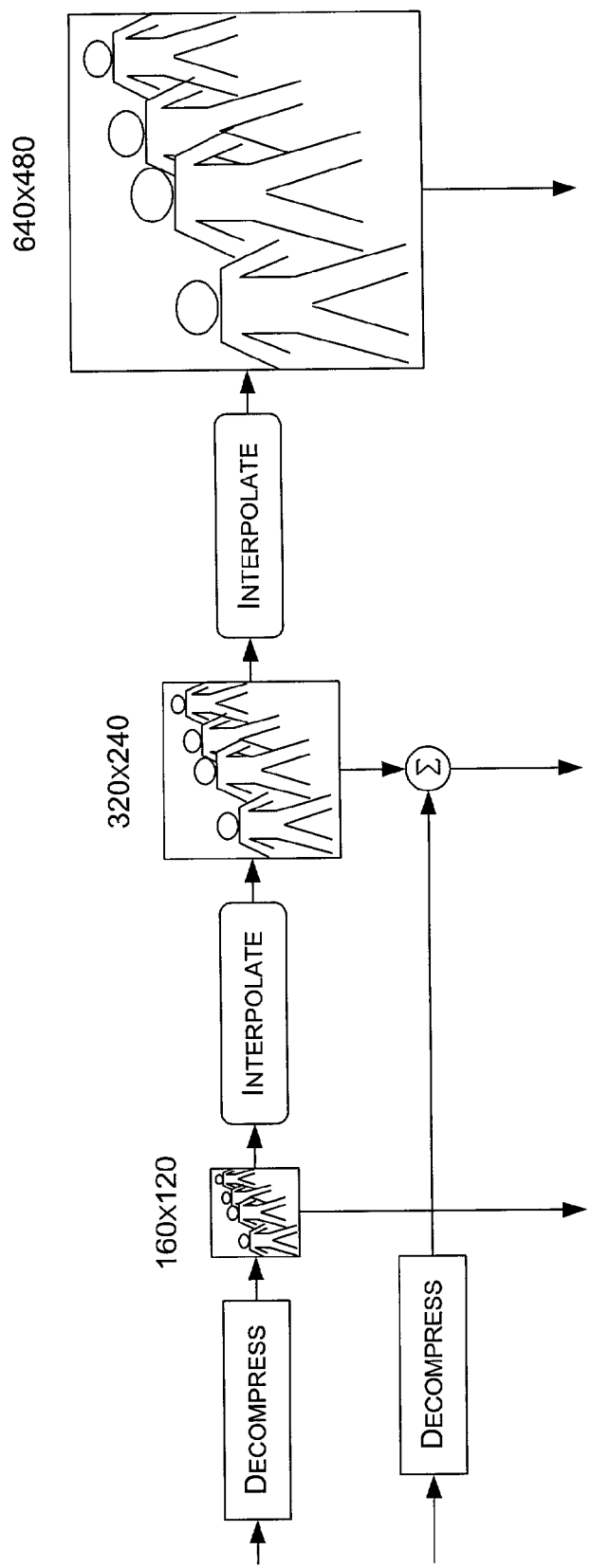
FIG. 7 is a schematic illustration of the Laplacian pyramid composition algorithm.

The decoder can support up to three spatial resolutions i.e. 160×120, 320×240 and 640×480 (see FIG. 7). To decode a 160×120 image the decoder just decompresses the 160×120 image. To get a 320×240 image the decoder first decompresses the base layer (i.e. 160×120) image and then up-samples it. The next step is to decompress the error data in the first enhancement layer and add it to the up-sampled base image. The 640×480 resolution is obtained by up-sampling the reconstructed 320×240 image.

In order to achieve bandwidth scalability with an embedded bit stream we use hierarchical table-lookup vector quantization [9] as our quantization scheme. Embedded coding is essential in achieving many of the above goals. Both embedded coding and hierarchical table-lookup vector quantization can be performed by tree-structured hierarchical table-lookup vector quantization (TSHVQ) [11].

Figure 8:
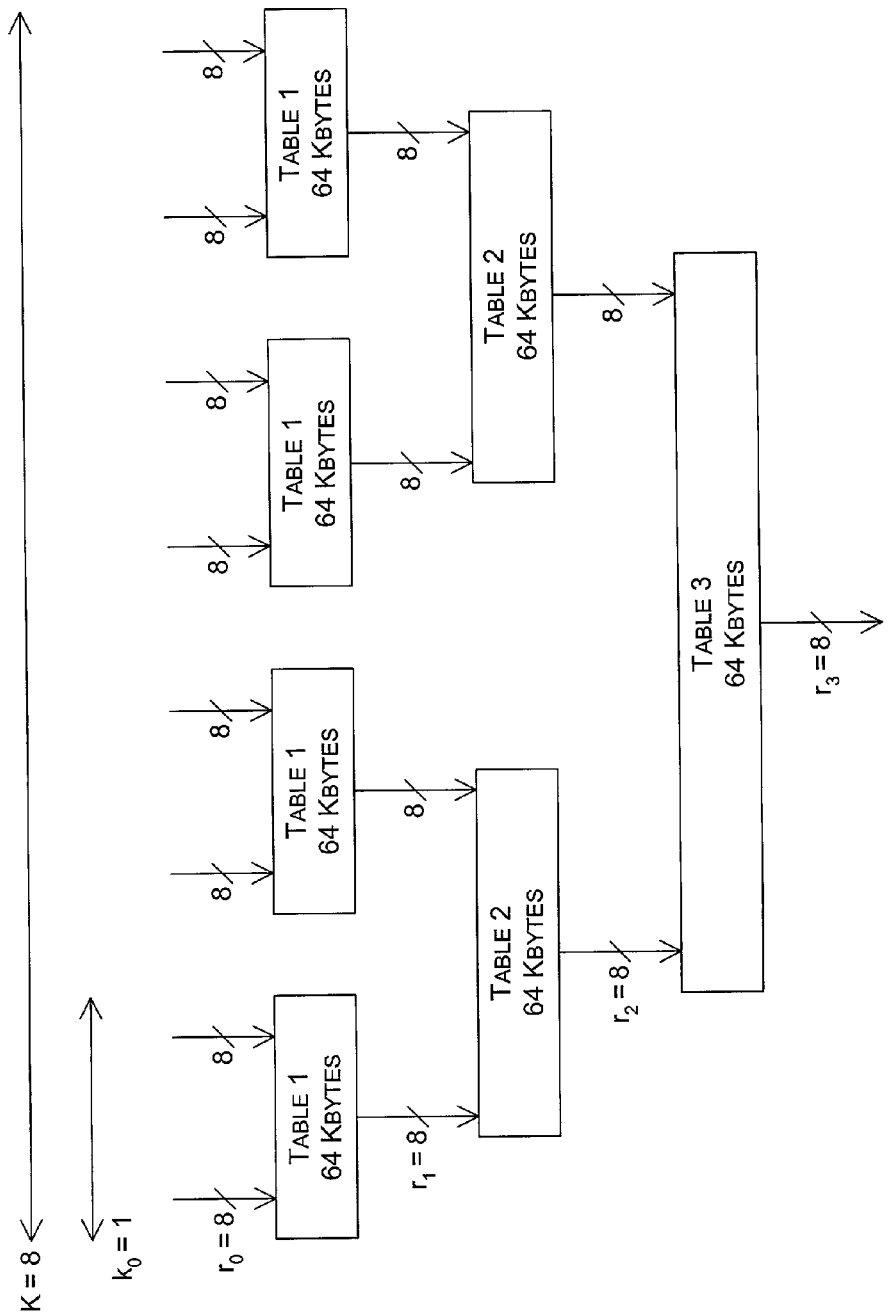
FIG. 8 is a schematic illustration of the hierarchical vector quantization encoding algorithm.

Hierarchical table-lookup vector quantization (HVQ) [9] is a method of encoding vectors using only table lookups. By performing the table lookups in a hierarchy, larger vectors can be accommodated in a practical way, as shown in FIG. 8. In the figure, a K=8 dimensional vector at original precision r0=8 bits per symbol is encoded into rM=8 bits per vector (i.e., at rate R=rM/K=1 bit per symbol for a compression ratio of 8:1) using M=3 stages of table lookups. In the first stage, the K input symbols are partitioned into blocks of size k0=2, and each of these blocks is used to directly address a lookup table with k0r0=16 address bits to produce r1=8 output bits. Likewise, in each successive stage m from 1 to M, the rm-1-bit outputs from the previous stage are combined into blocks of length km to directly address a lookup table with kmrm-1 address bits to produce rm output bits per block. The rM bits output from the final stage M may be sent directly through the channel to the decoder.

The table building procedure is described in [9]. It was also shown in [9] how to incorporate perceptually significant distortion measures into HVQ based on weighting the coefficients of arbitrary block transforms (WTHVQ). The perceptual weighting varies over the image but because it is embodied in the distortion measure of the vector quantizer, no side information is required to describe the weighting to the decoder. Essentially, the transforms are pre-computed and built into the encoder and decoder lookup tables. Thus WTHVQ gains the perceptual advantages of transform coding while maintaining the computational simplicity of table lookup encoding and decoding.

In order to get an embedded code we use tree-structured VQ at the last stage of WTHVQ [11]. In TSVQ the codewords are arranged in a tree structure, and each input vector is successively mapped (from the root node) to the minimum distortion child node. TSVQ produces an embedded encoding of the data. If the depth of the tree is R and the vector dimension is k, then bit rates can all be achieved. Algorithms for designing TSVQs and its variants have been studied extensively [12]. The last stage table outputs a fixed or variable length embedded index which is sent to the decoder.

TSHVQ has the same structure as HVQ except that the last stage codebook and table are tree-structured. Thus in TSHVQ the last stage table outputs a fixed or variable length embedded index which is transmitted on the channel. The design of TSHVQ is described in [11].

In order to exploit the temporal redundancy in the kind of video we deal with we use conditional-replenishment (CR). The CR is performed on the 320×240 resolution video in our system. The same CR map is used for the different resolutions of video in the Laplacian pyramid decomposition. Each N×N block in the current 320×240 frame is compared with the block at the same spatial position in a previous compressed frame with respect to a distance measure and if the difference is greater than a threshold then the new block is transmitted otherwise it is replenished by the block in the previous frame. Blocks which don't get send for a while are transmitted as background blocks. This is essential to reduce the error propagation due to packet loss and also to provide background blocks to receivers who join the multicast session at different times.

Figure 9:
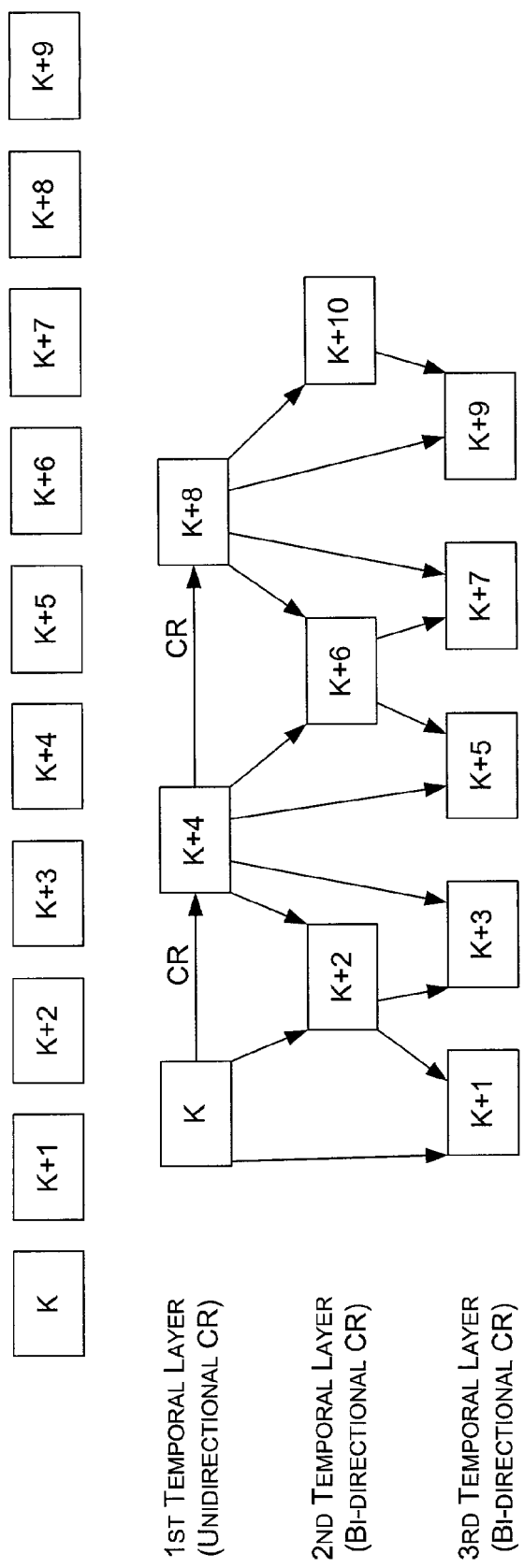
FIG. 9 is a schematic illustration of the embedded CR used in an experimental prototype in accordance with the present invention.

In order to achieve frame-rate scalability we perform CR in an embedded fashion [5]. The basic idea is depicted in FIG. 9. The CR is performed unidirectional as forward CR for the first temporal layer. Next the second temporal layer is coded using bidirectional CR. For e.g. frame k+2 is compared with respect to both frame k and k+4 to perform CR. The third temporal layer is also coded using bidirectional CR. For e.g. frame k+1 is compared with respect to both frame k and k+2 to perform CR. For bidirectional CR a '0' is transmitted to indicate that the block did not change with respect to the block in the previous frame, '10' indicates it changed with respect to the block in the previous frame but not with respect to the block in the future frame and '11' indicates that the block changed with respect to both the block in the previous and the future frame for that temporal layer. In the first two cases the block is replenished from the block in the previous and the future frame respectively. In the third case the current block is sent intra-coded. The CR side information is run-length coded to reduce the transmission overhead for it. To avoid temporal latency and the buffering at the client the bidirectional CR is performed also as unidirectional in some applications.

Live Multicast of Video Streams

The encoder puts out the entire spatial-temporal embedded stream (FIG. 10) for the different resolutions and rates onto the network as a set of multicast trees. This is achieved by sending the embedded video stream on multiple multicast groups (MMG) by mapping layers of the embedded video stream to the different multicast groups. Each layer of video is packetized based on the Real-Time Transport Protocol (RTP) [13]. The source has no idea about the receivers at the different destinations. The receiver decides which multicast groups to join/leave based on a control algorithm. Thus groups which are not joined get pruned.

The receiver runs a control algorithm to decide which groups to join/leave. The receiver runs a bandwidth estimation algorithm to keep track of the bandwidth available to it. The source sends the information to the receiver about the different multicast groups, their associated rates, which portion of the spatial-temporal embedded stream they belongs to and other useful information in the base layers of the embedded stream. Thus the receiver comes to know about what will happen if it joins certain groups in addition to the groups its already joined. If there is bandwidth available then the receiver joins some more multicast groups till it uses up the bandwidth. When the receiver detects that it is using more bandwidth than is available to it leaves some multicast groups till it reaches the bandwidth available to it. Thus the join/leave of groups can be performed efficiently by not driving the network to a state of congestion and causing losses.

FIG. 10.1 shows the spatial arrangement of packets. It can be seen that the encoder sends the index-planes for different resolutions in different packets. For e.g. the B4 packet corresponds to the base layer with only 4-bits of index. Packet B8 contains the 8th bit of index for the base layer. Similarly E14 contains the 4th bit of the index for the first enhancement layer. FIG. 10.2 shows the temporal arrangement of packets. It can be seen that the encoder sends the video data in four temporal layers (T1, T2, T3, T4) corresponding to frame rate of 3.75, 7.5, 15 and 30 fps respectively. In a multicast scenario for example, one multicast group gets video data from B4 to E16 spatial layers and T1 to T3 temporal layers, while another multicast group only gets video data from B4 to B8 spatial layers and T1 to T2 temporal layers. Thus for the second multicast group the layers which are not used get pruned.

Experimental Prototype

Our experimental prototype consists of a video encoder, video decoder, packetizer and a network unit. The video encoder consists of a conditional replenishment unit, Laplacian pyramid encoding using a tree-structured hierarchical table-lookup vector quantizer based on a perceptual distortion measure. The video decoder consists of a table-lookup vector quantizer with built in support for color-conversion and dithering. The video decoding is only performed on those blocks which change with respect to the previous frame. The packetizer at the source packetizes the video stream based on the RTP protocol and provides the right headers. The packetizer at the receiver depacketizes and gives the video stream to the decoder to decode and display. The network unit at the source splits the embedded video stream packets into multiple multicast groups (MMG). The network unit at the receiver decides to join/leave multicast groups based on the available bandwidth. The join/leave decision is taken by the receiver by running a control algorithm.

In the first stage of our video encoder embedded conditional replenishment is performed. The blocks which change are encoded using the Laplacian pyramid algorithm using a tree-structured hierarchical table-lookup vector quantizer. The encoder produces the indices for each layer as an embedded stream with different index planes. The first index plane contains the index for the rate TSVQ codebook. The second index plane contains the additional index which along with the first index plane gives the index for the rate TSVQ codebook. The remaining index planes similarly have part of the indices for TSVQ codebooks respectively. The advantage of this encoding of the indices is that it produces an embedded prioritized bit-stream. Thus rate or bandwidth scalability is easily achieved by dropping index planes from the embedded bit-stream. The decoder can use the remaining embedded stream to index a TSVQ codebook of the corresponding rate.

For joint source-channel coding the two layers (base and enhancement) are split into many embedded layers (FIG. 10) and are sent after packetization on multiple multicast groups by the network unit. This is achieved by sending subsets of the embedded bit-stream on different multicast addresses. For example, spatial layers B4, (B5–B8), (E12–E14) and (E16–E18) can be sent in T1, T2, T3 and T4 temporal layers thus giving eight different layers which can be sent on different multicast addresses. The receiver decides which multicast groups to join/leave based on the bandwidth it is getting.

The decoder looks up the reproduction vector in the corresponding rate TSVQ decoder codebook, which has the inverse block transform performed on the codewords of encoder codebook. Thus at the decoder there is no need for performing inverse block transforms.

Computational scalability is provided at the decoder by the use of the Laplacian coding scheme and the use of TSVQ. TSVQs achieve computation scalability proportional to bandwidth as the computation performed in lookups is different for different TSVQ codebooks and scales proportionately with the depth of the tree.

Set Forth Below is a Detailed Description of a Specific Frame-Work for Accomplishing Motion Compensation Using Quadtrees:

Many well-known video coding schemes use block-matching based motion compensation with a fixed block size, and motion vectors are coded using lossless entropy coding. The disadvantages of this method are that: 1) the predetermined block size is independent of the scene and may not be optimal; 2) the rate for encoding the motion vectors is fixed but may not be the optimal rate allocation between motion vectors and motion compensated prediction error.

We propose a scene adaptive motion compensation and coding scheme based on the quadtree structure with entropy-constrained vector quantization (ECVQ). For each block size, an entropy-constrained vector quantizer is built to provide good motion vectors over many rates. A quadtree structure is then constructed that finds the best block size to perform adaptive motion compensation for each area of the frame, and thus optimally allocates rates among the quantizers. Our simulation results have shown that this coding algorithm has superior rate-distortion performance over the fixed-block-size ECVQ method and the traditional full-search method with lossless coding.

In video coding, it is beneficial to use motion compensation to reduce the temporal redundancy between consecutive frames. One method that is employed by many well-known video coding schemes and standards such as px64[1] and MPEG[2] is the block-based full-search method, which includes the following three steps:

1. Motion compensation: The current frame is equally divided into blocks of fixed size. For each block, search among all the blocks within a search window in the previous frame and find a block that minimizes some distortion measure between that block and the current block.

2. Encoding of motion vectors by lossless entropy coding.

3. Encoding of the motion compensated prediction error.

Various schemes have been introduced to improve either one or more of the above three aspects. For example, to speed up the motion compensation, one may use some heuristics to search only a subset of all possible motion vectors and find a sub-optimal motion vector, such as the variable state motion search in [3]. Other faster motion compensation algorithms have also been proposed.

Another aspect that can be improved is the encoding of motion vectors, which is the focus of this paper. Since the final goal in video coding is to minimize total rate R, which is the sum of the rate of motion vectors RM and the rate of prediction error RE, a desirable feature for the motion vector encoder is to be able to provide variable rates so that, when a target rate is given, an optimal rate allocation between RM and RE can potentially be found that minimizes the overall reconstruction error. In [4], Joshi, et. al. studied the lossy encoding of motion vectors using entropy-constrained vector quantization and have shown its advantage over the full-search method in terms of the rate-distortion performance. Though it has been shown that a significant bit rate reduction can be achieved at the cost of a relatively small drop in prediction error, the rapid degradation of performance at lower rates makes it undesirable for low bit rate applications. Another disadvantage is that the performance in different bit rate ranges varies with the block size. There is no single block size that works well for all rates.

One reason that the method in [4] doesn't work well is the due to the fixed block size for motion compensation. In our algorithm, multiple ECVQ quantizers are built for multiple block sizes, and a quadtree-based coder adaptively segments the frame into variable-size blocks. The motion vector of each block is found and encoded using the code book for that block size and the overall distortion and rate are minimized. The overall optimal quadtree structure is constructed using a Lagrange multiplier method.

This paper is organized as follows: Section 2 formulates the problem and introduces the background of ECVQ and quadtree. Section 3 describes the details of our adaptive algorithm. Simulation results are presented and discussed in Section 4. Section 5 gives the conclusions and future work.

Definition of Distortion and Rate

Let $I1(x, y)$ and $I2(x, y)$ denote the intensities of two consecutive video frames. If the block size for motion compensation is $N \times N$, for a given block B in the current frame and a motion vector $m=(m_x, m_y)$, we define the distortion between the original block and the motion compensated block in the previous frame to be their mean-square-error (MSE):

In the full-search method, the candidate motion vectors are all the vectors with a search window W, i.e. Let M denote the set of all possible motion vectors, for each block B, motion compensation is basically the following minimization process:

We define the rate to code a motion vector to be the first order entropy, bits/pixel, where Pm is the probability of using the motion vector m from the codebook.

ECVQ of Motion Vectors

An efficient motion compensation and coding scheme should minimize both the average rate to code all the motion vectors in a frame and the average distortion. But these are two contradicting requirements: the more precise and detailed the motion compensation is, the less the prediction error (or distortion), but the more bits that are needed to code the motion information; and vise versa. However, one can make a choice as to how much more distortion one would like to trade for smaller rate. One method that allows this is the ECVQ proposed by Chou, Lookabough and Gray [5].

The vector quantization of a motion vector can be interpreted as the following: Suppose for a block B, the true motion vector for it is mo but we are only allowed to represent it with a motion vector from the codebook C, the distortion thus induced being $d(m_o, m) = D(m)$.

The bits to encode the codeword index $i(m)$ is $l(i(m))=$. The goal of ECVQ is to minimize the objective measure: where the controls the rate. When, all emphasis is given to minimize the true prediction error, which corresponds to the full-search motion compensation. As increases, the rate decreases while the distortion increases. More details on ECVQ can be found in [5].

Principle of Quadtrees

The quadtree is a hierarchical data structure for describing two-dimensional regions. It is a straightforward representation that allows for the adaptive segmentation and efficient description of possibly complex 2D shapes. When the quadtree is used for image coding, which has been employed by several authors[6]–[9], the image is first pre-divided into blocks of a fixed and relatively large size. Each block can be subdivided into four sub-blocks which is a quarter of the predecessor. The subdividing can be repeated recursively many times, until there is no further blocks to divide, or no further division is needed. The resulting data structure is a tree where each parent node has four children. Each node corresponds to a sub-block in the image that can be uniquely identified. This structure can be easily described by a variable length code.

Other than the subdividing method described above, (which is also called the top-down method), a quadtree can also be constructed in a bottom-up fashion by testing whether to merge four adjacent sub-blocks. The construction starts with the smallest block size allowed and can be repeated recursively till the largest block size allowed is reached. In our work, we used the bottom-up construction.

The binary test that one uses to decide whether to merge the four child nodes depends greatly on the application and the objective function one tries to minimize. In our work, since the objective function we would like to minimize is the combined rate and distortion, we use the algorithm that is similar to that described in [6].

Suppose we want to find the optimal quadtree for block $X_{n+1}$ of size $2^{n+1} \times 2^{n+1}$ and assuming that we already know the optimal quadtree structure for its four $2^n \times 2^n$ sub-blocks, $X_{n,i}$; $i=1, 2, 3, 4$. Let $D_{n+1}$, $R_{n+1}$ denote the distortion and rate for representing the block as a single leaf with block size $2^{n+1} \times 2^{n+1}$, and let $D_{n,i}$, $R_{n,i}$; $i=1, 2, 3, 4$, denote distortion and rate of its four optimal subtrees. The four subtrees are merged into one leaf node if, where and. This process results in a quadtree which is always optimal with respect to the objective function.

Quadtree-Based Adaptive Motion Coding

ECVQ Codebook Design

First, we need to build ECVQ codebooks for each block size. The algorithm resembles the one described in [5], but because the data to be quantized is in the motion vector domain while the distortion is defined in the image intensity domain, special measures need to be taken in generating the training data and computing the centroid. Given, a block size N, and an inital codebook, the algorithm to generate the ECVQ codebook is as follows.

1. For all blocks in the training sequence, compute and store D(m) for all valid motion vectors. For example, for an integer precision motion and a search range from −8 to 8, there are 289 valid motion vectors in total. If there are K current blocks, this K×289 distortion array constitutes the training data set.

2. Optimize the encoder for the decoder. That is, for each block, choose the best motion vector that minimizes the modified distortion measure. During this process, calculate the probability (relative frequency) of each codeword and update the overall modified distortion. If the overall distortion is smaller than a threshold, stop. Otherwise continue.

3. Optimize the decoder for the encoder. For each codeword index, search all valid motion vectors and find the one that minimizes the average distortion over all the blocks that are assigned to this index. (Note that we use the original distortion measure d in the step). This motion vector is the new codeword for this index. Based on the index probabilities found in Step 2, update the codeword lengths l(i). Go to Step 2.

Note also that the above training algorithm differs from the one used by Joshi, et. al. in [4]. In their work, the codewords are fixed. In our algorithm, the codewords are updated each time we compute the 'centroid' in Step 3.

Quadtree-Based Motion Coding

The largest block size we use in the quadtree structure is 16×16. Though a larger size can be chosen, we use 16×16 mainly for the purpose of comparing its performance with existing video coding algorithms. The smallest block size we use is 4×4, so there are 3 possible levels in the quadtree. The reason we don't use 2×2 or even 1×1 blocks is to avoid the noise present in the motion field obtained by using motion compensation on very small block sizes.

For each 16×16 block, a quadtree is built using the bottom-up method described in Section 2.3. For each sub-block that is a leaf, the corresponding ECVQ codebook is searched and the motion vector that gives the minimal modified distortion is chosen. The indices, along with the tree-structure, constitute all the motion information that needs to be sent.

Simulation Results

In this section we give the simulation results. We give the rate-distortion curves for four 8-bit monochrome sequences with different motion contents. They are 1) the "football" sequence with generic motion; 2) the "table tennis" sequence, which contains camera zooming; 3) the "flower garden" sequence, which contains camera panning; and 4) a sequence with a note pad on the table while the camera is rotating along its optical axis. The first three sequences all have size 352×240 while the last one is 320×240. The codebooks for 16×16, 8×8, and 4×4 blocks were generated based on the training of 5 pairs of consecutive frames, each pair from a different sequence. None of the test frames are from the training set.

Looking at the PSNRs (Peak Signal-to-Noise Ratios) of the prediction error for a frame vs. the average rates to send the motion information (including the overhead rates to send the quadtree structure) for the four different test sequences (using four rate-distortion curves, corresponding to four methods, namely, fixed-block-size ECVQ for block sizes of 16×16, 8×8, and 4×4, and our quadtree-based adaptive coder. The search window is limited to −8 to 8 in all cases.) We have the following observations:

1. The proposed adaptive scheme provides a larger range of rates on which one can operate than the fixed 16×16 and 8×8 ECVQ.

2. In all cases, irrespective of what kind of motion is present, the proposed quadtree-based method performs better than the others over almost all rates. Its rate-distortion curve has a large segment where it is relatively flat, which means a huge reduction in rates can be achieved with very little increase in prediction error. And for the same rates, the proposed method has a 2–4 dB PSNR improvement for lower rates.

3. For lower rates, the quadtree-based method can always achieve better PSNR than fixed 16×16 or 8×8 ECVQ. At higher rates, its performance is close to that of a 4×4 ECVQ, but not worse.

4. For a sequence with camera zooming, the fixed-block-size ECVQ is not desirable because it has no flat region on the rate-distortion curve with either block size. On the other hand, the quadtree-based method has a relative segment from high to lower rates. The advantage of this is quite visible.

5. For a sequence with camera panning, the performance of ECVQ with block size of 4×4 is extremely poor—the PSNR started to degrade rapidly while the rate is still relatively high. So if the target rate is in this rate range, using the quadtree-based coder is extremely beneficial.

6. For a sequence with camera rotation, the performance of the proposed scheme is very close to fixed 4×4 ECVQ over high to mid rates. Its advantage is only visible over a small range of low rates.

CONCLUSIONS

In this paper we have presented an adaptive motion encoding scheme based on the quadtree data structure with ECVQ. A quadtree is constructed from bottom-up to decide the block size that best adapts to the frame content. The motion vector for each block is found from an entropy-constrained codebook according to its block size instead of doing the traditional full-search in the whole search window. Our simulation results have shown that it not only provides a dynamic range over all rates, (which the full-search method cannot do,) but also has a significant quality gain in terms of PSNR over the fixed-block-size ECVQ, especially over lower bit rates. This makes it a very good candidate for encoding motion in low-bit-rate applications.

For future work, we are considering the possibility of combining the quadtree structure with other faster algorithms for motion compensation. We are also working on using differential coding of motion vectors in a quadtree framework. We are also considering to build a closed loop video coder which incorporates the proposed adaptive motion coder with an adaptive coder for the residual frames.

Set Forth Below is a Detailed Description of a Specific Frame-Work for Intra-Frame Compression:

In this paper we present an algorithm for image compression which involves adaptively segmenting a block of residuals resulting from prediction, while encoding them using hierarchical table lookup vector quantization. An optimum decomposition of the block allows an image to be adaptively quantized depending on the statistics of the residual block being encoded. This is useful since most images are nonstationary and have some regions with high detail and some with little. With an optimum decomposition, we can adaptively allocate bits by varying the block size to be quantized. Predictive vector quantization (PVQ) allows us to take advantage of the correlation between adjacent blocks of pixels being encoded by providing memory. The quadtree structure is used to represent the segmentation information and is sent as side information. To reduce encoding complexity, we use hierarchical table lookups so no arithmetic computations have to be performed to find the minimum distortion codeword. To further improve performance, we use a variable rate code to decrease the rate. Also, to improve the subjective quality of the image, we use subjective distortion measures.

One of the main problems with full search vector quantization (VQ) [1] is that the encoder and codebook design complexity grows linearly with the number of codewords in the VQ codebook, which grows exponentially with the bit rate and vector dimension. However, the decoder is simply a table-lookup. So VQ is often used only in places where a simple decoder is required, but a complex encoder can be used.

Structured vector quantizers have been implemented to reduce the encoder complexity [1]. One such method, hierarchical vector quantization (HVQ) [2],[3], uses a set of hierarchical table lookups to perform the encoding. Since the tables can be built in advance, the actual encoder doesn't have to perform any arithmetic computations to find the minimum distortion codeword. Hierarchical table lookups are used so that larger vector dimensions can be used with a reasonable amount of memory. Also, since the tables can be built in advance, it is easy to incorporate subjective distortion measures. They can be precomputed when the table is built. Recently, there has been a lot of work in combining HVQ with other techniques such as wavelet (subband) coding [4], VQ with memory [5],[6] and applying it to low complexity software-only-encoding of video and images [4],[7]. Also, there has been work on combing HVQ with block transforms with perceptually weighted distortion measures [3].

Since the VQ encoder complexity grows rapidly with vector dimension, VQ can only be used to encode images with either small block sizes or large block sizes with relatively small codebooks. However, small codebooks with large block sizes often result in too much compression and too much distortion. To overcome the affects of small block sizes, vector quantization with block memory such as predictive vector quantization (PVQ) [8] and finite state vector quantization (FSVQ) [9] can be used. These algorithms use the correlation between adjacent blocks of pixels to achieve the performance of VQ with a large codebook while using a much smaller codebook. Prediction allows one to use a smaller codebook since the residuals resulting from prediction have a much smaller variance than the actual pixel values. Also because the correlation between adjacent blocks is used for prediction, grayscale continuities across blocks are better preserved, thus reducing blockiness.

Another problem with VQ is the inability of the codebook to adapt to nonstationarities in the image. All blocks are quantized using the same codebook. A method that can be used to improve performance is to adaptively allocate bits to different spatial regions of the image [10],[12]. Segmentation can be done to identify regions of the image which have low detail and can thus be highly compressed, and regions of high detail, such as edges, which cannot be highly compressed. Recently, there has been work on how to do this segmentation optimally [11]. An algorithm presented by Baker and Sullivan [11] shows how a quadtree decomposition can be used to optimally decompose a block based upon its statistics. Basically, this algorithm divides blocks which have too much distortion when being encoded into four subblocks and encodes these subblocks. In this fashion, regions of high detail get extra bits.

We propose to use a quadtree decomposition to optimally segment a block of residuals resulting from prediction. Since the error residuals resulting from prediction have varying statistics across the image, adaptively allocating bits by using different quantizers on different regions of the image can result in improved performance over using a single quantizer to encode the residuals. The residuals often have large regions of constant intensity and small regions of fine detail which make them ideal for adaptively selecting a quantizer. The segmentation is used to adaptively select the size of a block to be encoded. All encodings are done using table lookups, so no arithmetic computations are performed for the encoder. Although the segmentation information is added side information, the reduction in rate resulting from adaptively segmenting the residual blocks more than makes up for this.

The residuals can be encoded in two ways. One way is use a single block size to find the residuals and then encode them using an optimal quadtree segmentation. However, this has the problem that the inner subblocks after segmentation will not be predicted well and thus the correlation between adjacent subblocks would not be exploited. To alleviate this problem, one can recursively predict the subblocks from the surrounding subblocks rather than using a single block size for the prediction.

Section 2 of the paper explains table lookup vector quantization. In section 3, we explain how the predictive hierarchical table lookup vector quantization with optimal segmentation algorithm works. In section 4, we present simulation results, and in section 5, the conclusion.

Hierarchical Table-Lookup VQ

Hierarchical table-lookup vector quantization (HVQ) [2], [3] is a method of encoding vectors using only table lookups. It was used for speech coding in [2] and extended to image coding in [3], [4].

By performing the table lookups in a hierarchy, larger vectors can be accommodated in a practical way. A K=8 dimensional vector at original precision r0=8 bits per symbol is encoded into rM=8 bits per vector (i.e., at rate R=rM/K=1 bit per symbol for a compression ratio of 8:1) using M=3 stages of table lookups. In the first stage, the K input symbols are partitioned into blocks of size k0=2, and each of these blocks is used to directly address a lookup table with k0r0=16 address bits to produce r1=8 output bits. Likewise, in each successive stage m from 1 to M, the rm-1-bit outputs from the previous stage are combined into blocks of length km to directly address a lookup table with kmrm-1 address bits to produce rm output bits per block. The rM bits output from the final stage M may be sent directly through the channel to the decoder, if the quantizer is a fixed-rate quantizer, or the bits may be used to index a table of variable-length codes, for example, if the quantizer is a variable-rate quantizer.

Clearly many possible values for km and rm are possible, but km=2 and rm=8 are usually most convenient for the purposes of implementation. For simplicity of notation, we shall assume these values in the remainder of the paper. The sizes of the tables at different stages of the HVQ can be changed to provide a trade-off [5] between memory size and PSNR performance.

The table at stage m may be regarded as a mapping from two input indices and, each in $\{0, 1, \ldots, 255\}$, to an output index also in $\{0, 1, \ldots, 255\}$. That is, =(,). With respect to a distortion measure between vectors of dimension Km=2m, design a fixed-rate VQ codebook, i=0, 1, . . . , 255 with dimension Km=2m and rate rm/Km=8/2m bits per symbol, trained on the original data using any convenient VQ design algorithm [1]. Then set to be the index of the 2m-dimensional codeword closest to the 2m-dimensional vector constructed by concatenating the 2m-1-dimensional codewords and. The intuition behind this construction is that if is a good representative of the first half of the 2m-dimensional input vector, and is a good representative of the second half, then, with im defined above, will be a good representative of both halves, in the codebook, i=0, 1, . . . , 255.

Predictive HVQ with Quadtree Coding

Predictive table-lookup hierarchical vector quantization [5] (PHVQ) with quadtree encoding is a form of vector quantizer with memory and has the ability to adaptively select how to optimally segment a block of residuals to be encoded. However, the full search encoder in the algorithm is replaced with a table-lookup HVQ encoder. Also the optimum segmentation and prediction can be done with table lookups.

It consists of a predictor which uses the side pixels of quantized adjacent blocks to predict the current block to be encoded. The quantized blocks are used to predict since this is what the decoder will have. It then encodes the residual using the quadtree segmentation algorithm to optimally select the block sizes.

Problem Formulation

The image to be encoded is divided into m x m blocks, each with k pixels, and is scanned left to right and top to bottom. The blocks are scanned in the same order as the pixels. Let xn be the vector to be quantized at time n, and let yn be the corresponding transmitted channel symbol.

Predictive VQ

A predictive vector quantizer [8] (PVQ) is one which encodes the residual between the actual block and the predicted block instead of the actual block itself. Our PVQ uses the side pixels of the quantized adjacent blocks to predict the current block to be encoded.

Let sn represent a 2m dimensional vector of the side pixels of previously quantized blocks adjacent to the block xn. Then the residual of the k-dimensional block is: en=xn−Asn, where A is a k×2m matrix of the optimum linear prediction coefficients obtained by solving the Weiner-Hopf equation. Then yn is chosen to be the index of the codeword in the codebook which minimizes the distortion for the vector en.

The decoder receives yn which can be used to reproduce a quantized version of the residual. It also has the quantized versions of the adjacent blocks, so it is able to predict the current block. To the predicted block, it simply adds the quantized version of the residual.

Optimal Quadtree Segmentation

We use the quadtree data structure to represent the optimal segmentation of a particular block [11]. The quadtree consists of a tree whose root corresponds to the largest block size that can be encoded. Each node in the tree either has four children, meaning that the block is further subdivided into four subblocks, or no children, which means that the block is encoded [11]. The four subblocks are simply obtained by splitting an m x m block into four m/2×m/2 blocks. We use the algorithm by Sullivan and Baker to determine the optimal quadtree structure for each block.

Let be the minimum possible block size that can be encoded, and let be the maximum block size which can be encoded. Then, the optimal quantization of the image is the optimum quantization of each of the blocks. To obtain the optimum quantization of a block, we encode the block using a quantizer designed for that block size. Then, we compare the performance of this quantization with the performance of the optimum quantization of each of the four blocks. Let and be the rate and distortion of encoding the block using a quantizer designed for that block size and let and be the sum of the rates and distortions of the optimum encodings of the four subblocks. Then, if, the optimal encoding of the block is the encoding using the block quantizer, else it is the optimum encoding of the four subblocks, where is the Lagrange multiplier. The optimum encoding of a block is the actual encoding of the block since there are no quantizers for smaller block sizes available. The entire process of finding the optimum quantization is repeated for all. The larger the value of is, the more emphasis is placed on rate over distortion and subsequently more of the blocks are encoded using larger block sizes. The rate used to calculate whether to merge or not includes one bit of segmentation information required at each node of the quadtree. This one bit tells whether to split that particular block into four subblocks or whether to encode the actual block. All levels of the quadtree require this side information except for the minimum block size which cannot be split any further.

PHVQ with Quadtree Segmentation

There are two ways to combine PHVQ with quadtree segmentation. One way is to simply use prediction to first generate an m×m predicted block. Then the residual block between the actual block and predicted block can be encoded using a quadtree decomposition. However this doesn't take full advantage of the correlation between adjacent subblocks which are encoded. A better method is to use adjacent subblocks in the quadtree decomposition to find the residuals to encode. So, in this algorithm we first predict all the blocks using the smallest block size predictor. The residuals are encoded using HVQ. Then we use another predictor to generate residuals for the next block size. By using different predictors for each of the block sizes and using the adjacent pixels of the actual subblock being encoded, we take full advantage of the correlation between adjacent subblocks. If the decoder recursively decodes each of the four subblocks of a block which is split, then it is able to calculate the predicted blocks using the side pixels of the adjacent subblocks.

In our algorithm, all the full search encoders used in the quadtree decomposition are simply replaced with hierarchical table lookups. Therefore, no arithmetic computations are required to perform these encodings. Also, since hierarchical table lookups result in intermediate indices corresponding to a particular compression ratio, individual encoders do not need to be actually used for the various block sizes if one simply uses a quadtree decomposition on a block of residuals. The segmentation simply tells at which stage to stop the hierarchical table lookups. Even if one does the encoding using recursive predictions and encodings, the number of table lookups simply grows linearly with the number of levels in the quadtree. The prediction can also be done through the table lookups [5]. Also, the segmentation can easily be done by table lookups by storing the average distortions for each of the possible encodings at each stage of the table.

Variable Rate Coding

In order to further reduce the rate without increasing distortion, we use entropy constrained vector quantization [13] (ECVQ) to design the codebooks. This gives us a variable rate code since the transmitted symbols have a length matched to their probabilities. The variable rate indices can be built in to the last stage HVQ table.

Simulation Results

We give PSNR results here for the 8-bit per pixel monochrome image Lena (512×512). For the first method where a single predictor is used to get a block of residuals, we first generated a set of training vectors by obtaining residuals for a particular block size. The side pixels were used for generating the residuals. The residuals were recursively blocked to generate codebooks with various vector dimensions. To obtain quantizers with different bit rates, we generated codebooks with the same number of codewords but for different block sizes. For the recursive predictor and encoder, we generated residuals corresponding to each of the block sizes used in the quadtree decomposition and generated the codebooks for various vector dimensions. All the codebooks were generated using ECVQ algorithm and had 256 codewords.

Once the codebooks were generated, various values of were used to vary the compression in the encoding. For large values of, with a maximum block size in the quadtree decomposition being 8×8, most of the blocks were encoded as 8×8 blocks and thus a compression of 64:1 would have resulted if a fixed rate code were used (excluding the one bit of side information required for each block). For small values of, we would have a compression ratio of approximately 2:1 with a fixed rate code. We show PSNR curves for VQ, PVQ, VQ with quadtree, PVQ with quadtree on a block of residuals, and PVQ with quadtree with recursive prediction and encoding. For most rates, PVQ with quadtree on a block of residuals is approximately 1 dB better than PVQ and 1 dB better than VQ with quadtree alone. With PVQ with quadtree and recursive prediction and encoding, we gain about 2 dB more. With PHVQ with quadtree, we lose approximately 0.7 dB over PVQ with quadtree. The PHVQ with quadtree with recursive predicting and encoding is approximately 4–5 dB better than fixed rate HVQ. The compressed image using JPEG is compared with the recursive PVQ compressed image at the same bit rate (0.33 bpp). The JPEG image is much blockier and less perceptually pleasing. The segmentation map for the image shows how the bits are adaptively allocated and how the background regions get less bits.

CONCLUSIONS

We have presented an algorithm for adaptively selecting a quantizer to encode a block of residuals resulting from prediction. Since prediction is used, memory can take advantage of the correlation between adjacent blocks of pixels to allow us to use a smaller codebook than would be required with memoryless VQ. Since an optimal segmentation of the block of residuals is performed in the encoding, we are able to change our compression depending on the statistics of the block being encoded; This is beneficial since the residuals resulting from prediction are nonstationary. Also, since we use HVQ to encode, we are able to gain the advantages of perceptual weighting, VQ with memory and adaptive quantization while maintaining the computational simplicity of table lookups.

The invention claimed is:

1. A method used in compressing data, the method comprising:
   converting data into a series of data vectors;
   making a prediction of a current data vector based at least in part on one previous data vector;
   segmenting the current data vector into a plurality of sub-vectors; and
   mapping, using a hierarchical lookup table comprising a plurality of lookup tables, the plurality of sub-vectors to a set of codes by successive utilization of the plurality of lookup tables in stages so that one of the codes is generated in response to each of the sub-vectors wherein the set of codes comprise codes of different lengths.

2. A method used in compressing data, the method comprising:
   converting data into a series of data vectors;
   making a prediction of a current data vector based at least in part on one previous data vector;
   segmenting the current data vector into a plurality of sub-vectors; and
   mapping, using a hierarchical lookup table comprising a plurality of lookup tables, the plurality of sub-vectors to a set of codes by successive utilization of the plurality of lookup tables in stages so that one of the codes is generated in response to each of the sub-vectors wherein the set of codes comprise non-embedded codes.

3. A method used in compressing data the method comprising:
   converting data into a series of data vectors;
   making a prediction of a current data vector based at least in part on one previous data vector; and
   segmenting the current data vector into a plurality of sub-vectors wherein the plurality of sub-vectors comprise at least two sub-vectors of different sizes.

4. A data compression system comprising:
   a predictor configured to make a prediction of a current data vector based on at least one previous data vector; and
   a segmentor coupled to receive the prediction and configured to segment the current data vector into a plurality of sub-vectors based on the prediction,
   a hierarchical lookup table comprising a plurality of lookup tables, the hierarchical lookup table configured to map the plurality of sub-vectors to a set of codes by successive utilization of the plurality of lookup tables in stages so that one of the codes is generated in response to each of the sub-vectors, the hierarchical lookup table being coupled to the segmentor for receiving the plurality of sub-vectors wherein the set of codes comprise codes of different lengths.

5. A data compression system comprising:
   a predictor configured to make a prediction of a current data vector based on at least one previous data vector; and
   a segmentor coupled to receive the prediction and configured to segment the current data vector into a plurality of sub-vectors based on the prediction
   a hierarchical lookup table comprising a plurality of lookup tables, the hierarchical lookup table configured to map the plurality of sub-vectors to a set of codes by successive utilization of the plurality of lookup tables in stages so that one of the codes is generated in response to each of the sub-vectors, the hierarchical lookup table being coupled to the segmentor for receiving the plurality of sub-vectors wherein the set of codes comprise non-embedded codes.

6. A data compression system comprising:
   a predictor configured to make a prediction of a current data vector based on at least one previous data vector; and
   a segmentor coupled to receive the prediction and configured to segment the current data vector into a plurality of sub-vectors based on the prediction wherein the plurality of sub-vectors comprise at least two sub-vectors of different sizes.

7. One or more computer readable media having stored thereon a data compression program including a plurality of instructions that, when executed by one or more processors, causes the one or more processors to:
   make a prediction of a current data vector based on at least one previous data vector; and
   segment the current data vector into a plurality of sub-vectors based at least in part on the prediction,
   map, using a hierarchical lookup table comprising a plurality of lookup tables, the plurality of sub-vectors to a set of codes by successive utilization of the plurality of lookup tables in stages so that one of the codes is generated in response to each of the sub-vectors wherein the set of codes comprise codes of different lengths.

8. One or more computer readable media having stored thereon a data compression program including a plurality of instructions that, when executed by one or more processors, causes the one or more processors to:
  make a prediction of a current data vector based on at least one previous data vector; and
  segment the current data vector into a plurality of sub-vectors based at least in part on the prediction,
  map, using a hierarchical lookup table comprising a plurality of lookup tables, the plurality of sub-vectors to a set of codes by successive utilization of the plurality of lookup tables in stages so that one of the codes is generated in response to each of the sub-vectors wherein the set of codes comprise non-embedded codes.

9. One or more computer readable media having stored thereon a data compression program including a plurality of instructions that, when executed by one or more processors, causes the one or more processors to:
  make a prediction of a current data vector based on at least one previous data vector; and
  segment the current data vector into a plurality of sub-vectors based at least in part on the prediction wherein the plurality of sub-vectors comprise at least two sub-vectors of different sizes.

* * * * *